(12) United States Patent
Tanaka et al.

(10) Patent No.: US 7,891,963 B2
(45) Date of Patent: Feb. 22, 2011

(54) MANUFACTURING APPARATUS OF RESIN CONTAINER

(75) Inventors: Kenjiro Tanaka, Yokohama (JP); Isamu Takeda, Yokohama (JP); Atsushi Yoneda, Yokohama (JP); Eriko Kimotsuki, Yokohama (JP)

(73) Assignee: Toyo Seikan Kaisha Ltd., Tokyo (JP)

( * ) Notice: Subject to any disclaimer, the term of this patent is extended or adjusted under 35 U.S.C. 154(b) by 70 days.

(21) Appl. No.: 12/379,141

(22) Filed: Feb. 13, 2009

(65) Prior Publication Data

US 2009/0208599 A1 Aug. 20, 2009

Related U.S. Application Data

(62) Division of application No. 11/629,621, filed on Dec. 15, 2006, now abandoned.

(51) Int. Cl.
*B29C 47/06* (2006.01)
*B29C 47/20* (2006.01)
(52) U.S. Cl. ...................... 425/133.1; 425/532; 425/462
(58) Field of Classification Search .............. 425/133.1, 425/532, 462
See application file for complete search history.

(56) References Cited

U.S. PATENT DOCUMENTS

| 3,329,752 A | * | 7/1967 | Heider et al. ............... 264/539 |
| 2003/0000909 A1 | | 1/2003 | Sakaguchi et al. |

FOREIGN PATENT DOCUMENTS

JP    2000-117818 A    *   4/2000

* cited by examiner

*Primary Examiner*—Yogendra N Gupta
*Assistant Examiner*—Joseph Leyson
(74) *Attorney, Agent, or Firm*—Manabu Kanesaka

(57) ABSTRACT

A manufacturing apparatus of a resin container includes a main extruder which supplies a base material resin, and a sub-extruder which supplies a sub-material. The sub-material supplied from the sub-extruder is discharged from a discharge portion provided in a die head so that the sub-material joins the base material resin continuously supplied from the main extruder. A parison is then extruded from a slit portion opened on an end side of the die head, and subjected to blow molding, thereby forming a coating layer which covers the whole or a part of a container body formed of the base material resin by using the sub-material. A suck-back mechanism which pulls back the sub-material from the discharge portion is provided between the sub-extruder and the die head, and the discharge portion is provided in the vicinity of the slit portion in-the die head.

5 Claims, 17 Drawing Sheets

MANUFACTURING APPARATUS OF RESIN CONTAINER

CROSS REFERENCE TO RELATED APPLICATION

This is a divisional application of patent application Ser. No. 11/629,621 filed on Dec. 15, 2006, now abandoned.

BACKGROUND OF THE INVENTION AND RELATED ART STATEMENT

The present invention relates to a manufacturing apparatus of a resin container to which a decorative design having a higher sense of togetherness can be applied by changing a thickness of a coating layer partially formed in a container body at a boundary portion between the coating layer and a part where the coating layer is not formed.

In recent years, a demand for resin containers has been increased. For example, various commercial products such as food products like beverage products or sanitary goods like a body soap or a shampoo are accommodated in resin containers and sold over counters. Under such circumstances, there are commercial products which have a tendency that conformations of their containers are similar because of characteristics of the commercial products, and it is often the case that similar commercial goods are accommodated in similar containers and sold.

On the other hand, general consumers consider a quality, a price and others of each commercial product when deciding purchase. Although it is a matter of course, an impression given by an appearance of a commercial good may have a great influence of a judgment upon purchase in some cases. In particular, when comparing commercial products which have almost no difference in quality, price and others, such a tendency becomes strong. Further, a container which is an appearance itself of a commercial product largely concerns formation of a commercial product image. In general, it can be said that earnings of a commercial product tend to increase when an excellent commercial product image is formed, but earnings of the commercial product tend to fail to rise when a bad commercial product image is formed. In this manner, an appearance of a commercial product, i.e., an impression which is given to consumers by a design of a container is very important in order to drive the consumers to buy.

Meanwhile, as a resin container in which the above-described commercial product is accommodated, one manufactured by a molding method called "blow molding" is generally used (see, e.g., a paragraph [0010] of Patent Reference 1: Japanese Patent Application Laid-open No. 2000-142662, a paragraph of Patent Reference 2: Japanese Patent Application Laid-open No. 2000-238116 or the like). In blow molding, a molten material (a parison) extruded in a cylindrical shape from an extruder is held by a metal mold and air is blown into this material, thereby obtaining a hollow molded piece. Each of Patent Reference 1 and Patent Reference 2 discloses a multi-layer thin container which is provided with desired functional characteristics by adjusting an extruding quantity of a resin forming one layer when extruding a parison having a double-layered structure.

In such a resin container, a geometric design is applied and, on the other hand, a label sticker on which a commercial product name or the like is printed is put, or a film material such as a shrink label or a stretch label is attached so that commercial goods are discriminated. Further, there is appropriately performed direct printing on a container surface by appropriate printing means such as screen printing, uniform coloring of an entire container by adding a pigment or the like to a material resin forming the container, and others. These methods are generally utilized in order to apply a design using colors or colored patterns to containers.

In the method putting a sticker or attaching a film material, however, a sense of togetherness with a container is hard to be obtained, and the design is greatly limited. Furthermore, in such containers, labels must be separated at the time of discard, and hence it can be considered that containers with stickers or film materials are distantly respected by consumers. Moreover, in the method of performing direct printing on a container surface, for example, printing is difficult unless a relatively flat surface is provided, and hence there is a restriction in printing. Additionally, these methods are disadvantageous in terms of a manufacturing cost because they require a secondary process. On the other hand, in the method of coloring a container by adding a pigment or the like to a material resin, since molding and coloring can be simultaneously performed, this method is less disadvantageous in terms of a cost. However, a state of coloring is uniform in an entire container, and there is a drawback in which a change in colors cannot be expected.

As described above, in the conventional methods, various problems have been pointed out when applying a design using colors or colored patterns to containers. Although a container which appeals to consumers is demanded, an effective alternative idea has not been proposed yet. Even in Patent Reference 1 and Patent Reference 2 mentioned above, such design problems are not examined at all.

The present invention is proposed in order to solve the above-described problems of a prior art, and it is an object of the present invention to provide a manufacturing apparatus of a resin container, which can enhance the value of the container by, e.g., applying a decorative design having a high sense of togetherness to the container itself with a high degree of freedom.

The present invention is directed to a manufacturing apparatus of a resin container manufactured by blow molding a parison extruded from an extruder. The resin container comprises at least a container body and a coating layer which covers the whole or a part of the container body, the coating layer having a thickness reducing portion in which a thickness of the coating layer is successively reduced in a reduction rate of 0.1 to 1.5 μm/mm in a height direction of the container.

According to such a configuration, the value of the container can be enhanced by an excellent design effect or functional effect, thereby providing the resin container which greatly appeals to consumers.

Further, the resin container manufactured by the manufacturing apparatus according to the present invention can be configured in such a manner that the thickness reducing portion is formed in a range which occupies ¼ or more of a length of a container base portion in a height direction.

Adopting such a configuration can form a continuous gradation change in a wide range, thus improving design properties of the resin container.

Furthermore, the resin container manufactured by the manufacturing apparatus according to the present invention can be configured in such a manner that the coating layer disappears while reducing a thickness thereof, and a thickness reduction rate of the coating layer is 0.1 to 0.5 μm/mm at least in a range of 30 mm in the height direction immediately before a part at which the coating layer disappears.

Adopting such a configuration can provide directionality to a change in design or function realized by a change in thickness of the coating layer. In particular, when continuously changing a gradation to obtain a design effect, the thickness reduction rate in the range immediate before the coating layer disappearing part is set to the above-described range so that the change in gradation can be effectively prevented from being discontinued, thereby achieving the continuous and smooth change in gradation in the vicinity of the coating layer disappearing part.

Moreover, the resin container manufactured by the manufacturing apparatus according to the present invention is configured in such a manner that a color tone adjusting layer is provided on an outer surface side of the container body and the coating layer is formed on an outer surface side of the color tone adjusting layer.

According to such a configuration, forming the color tone adjusting layer which is used to adjust color tones of the container body and the coating layer can further improve design properties of the resin container.

Additionally, the resin container manufactured by the manufacturing apparatus according to the present invention can be configured in such a manner that a direction of a change in thickness of the coating layer along the height direction is opposite to a direction of a change in thickness of the color tone adjusting layer along the height direction at a part where the thickness reducing portion is formed.

According to such a configuration, it is possible to produce a continuous gradation change by combinations of colors of the container body, the coating layer and the color tone adjusting layer.

Further, when providing the above-described color tone adjusting layer, it is preferable for the resin container manufactured by the manufacturing apparatus according to the present invention that the coating layer and the color tone adjusting layer are formed of the same resin while considering printability at the time of printing a surface of the resin container. Furthermore, the coating layer and the color tone adjusting layer can be configured to contain a pearl pigment in order to give a pearly sense to the resin container.

Moreover, the resin container manufactured by the manufacturing apparatus according to the present invention may be configured to include an inner layer on an innermost surface of the container, or may be configured to include an outer layer on an outermost surface of the container. Additionally, it is preferable for the resin container manufactured by the manufacturing apparatus according to the present invention that MI of each of a base material resin forming the container body and a sub-material forming the coating layer is 0.1 to 30 g/10 min considering moldability.

Further, in the resin container manufactured by the manufacturing apparatus according to the present invention, a color which is similar to the color given to the container body but has a different color tone may be given to the coating layer, or a color whose hue is different from the color given to the container body may be given to the coating layer. According to such a configuration, a color itself of the resin container can be changed, thereby providing a decorative design having a high sense of togetherness. Demonstrating such a design effect can add a high value to the container, thus providing the resin container which further appeals to consumers.

Furthermore, the resin container manufactured by the manufacturing apparatus according to the present invention can be configured to contain an antibacterial agent in the coating layer.

According to such a configuration, since the coating layer which demonstrates an antibacterial function or a mildew resisting function is partially formed, an increase in cost can be suppressed, thus demonstrating a further effective antibacterial function or mildew resisting function with a small quantity of an antibacterial agent. Demonstrating such a functional effect can enhance the value of the container, thus providing the resin container which further appeals to consumers.

Moreover, a manufacturing method of a resin container by using a manufacturing apparatus according to the present invention is a method comprising: continuously supplying a base material resin forming a container body from a main extruder; discharging from a discharge portion provided in a die head a sub-material supplied from a sub-extruder so that the sub-material joins the base material resin; and extruding a parison from a slit portion opened on an end side of the die head; and blow-molding the parison, thereby forming a coating layer which covers the whole or a part of the container body by using the sub-material, wherein a thickness reducing portion in which a thickness is continuously reduced is formed in the coating layer while adjusting a resin pressure in a supply path of the sub-material fed from the sub-extruder by performing suck-back control which pulls back the sub-material from the discharge portion at an arbitrary timing when joining the sub-material with the base material resin.

By adopting such a method, a supply speed of the sub-material can be finely adjusted, a thickness of the coating layer can be continuously reduced at a small reduction rate, and a gradation change can be effectively prevented from being discontinued when producing the continuous gradation change in the thickness reducing portion to obtain a design effect in particular.

Additionally, in the manufacturing method of the resin container by using the manufacturing apparatus according to the present invention, it is preferable that the suck-back control is performed at least once before the resin pressure in the supply path of the sub-material is reduced to 70 to 15% of a maximum resin pressure when joining the sub-material with the base material resin, in order to effectively obtain an effect of the suck-back control, and it is also preferable that the suck-back control is performed before a reduction rate per unit time of the resin pressure in the supply path of the sub-material becomes 10% or below of a maximum reduction rate.

Further, in order to prevent a rate of change of the resin pressure after the suck-back control from being excessively increased, it is preferable for the reduction rate of the resin pressure in the supply path of the sub-material after the suck-back control to be five times or below the reduction rate before the suck-back control.

Furthermore, in the manufacturing method of a resin container by using a manufacturing apparatus according to the present invention, a direction of changing a thickness of the coating layer can be reversed by inverting a top side and a bottom side of a forming mold with respect to an extruding direction of a parison. Adopting such a method can express a symmetrical opposite change in color.

Moreover, in order to carry out the above-described manufacturing method, a manufacturing apparatus of a resin container according to the present invention is an apparatus comprising: a main extruder which supplies a base material resin; and a sub-extruder which supplies a sub-material, the sub-material supplied from the sub-extruder being discharged from a discharge portion provided in a die head so that the sub-material joins the base material resin continuously supplied from the main extruder, a parison being then extruded from a slit portion opened on an end side of the die head, the parison being subjected to blow molding, thereby forming a coating layer which covers the whole or a part of a container body formed of the base material resin by using the sub-material, wherein a suck-back mechanism which pulls back the sub-material from the discharge portion is provided between the sub-extruder and the die head, and the discharge portion is provided in the vicinity of the slit portion in the die head. The manufacturing apparatus of a resin container according to the present invention can have a configuration in which the die head is provided with a flow path of the sub-material, the flow path being constituted of: an annular portion which is formed to relatively approximate the discharge portion as distanced from a side on which the sub-material is supplied; and a cone-shaped portion which is continuous with the discharge portion from the annular portion, and a second suck-back mechanism can be provided at a position close to the die head.

According to the present invention, the excellent design effect or functional effect enhances the value of the container, thus providing the resin container which greatly appeals to consumers.

DETAILED DESCRIPTION OF PREFERRED EMBODIMENTS

Preferred embodiments of a resin container manufactured by a manufacturing apparatus according to the present invention will now be described hereinafter with reference to the accompanying drawings.

First Embodiment

Figure 1:
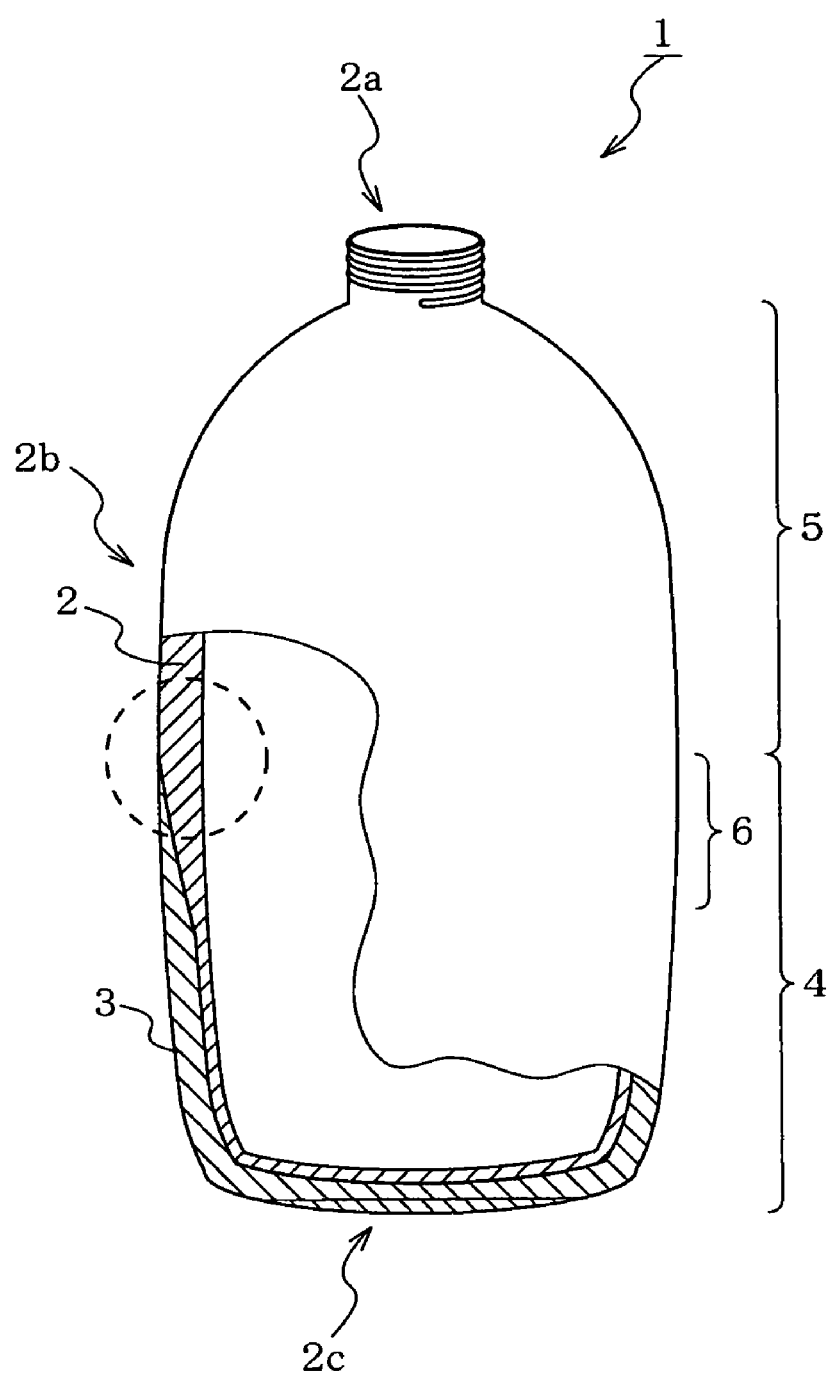
FIG. 1 is a partially cutaway cross-sectional view showing an outline of a resin container according to a first embodiment of the present invention.

FIG. 1 shows an outline of a resin container according to a first embodiment of the present invention, and is a partially cutaway cross-sectional view in which a part of a resin container 1 is cut away. The drawing shows an example in which the illustrated resin container 1 is applied to a container for a shampoo.

A coating layer 3 which partially covers a container body 2 is formed by using a resin having a different coloring state from that of the container body 2 in the resin container 1. Although the container body 2 is provided with an opening portion 2a, a base portion 2b, and a bottom portion 2c, a part below a substantially central part of the base portion 2b in a height direction and the bottom portion 2c are covered with the coating layer 3 in this embodiment.

Here, it is determined that the height direction is a direction along a direction perpendicular to a level plane when the container is placed on the level plane with the opening portion 2a facing the top side.

The resin container 1 is divided into two regions, i.e., a coating layer forming part 4 and a coating layer non-forming part 5 depending on whether the coating layer 3 is formed. A thickness reducing portion 6 in which a thickness of the coating layer 3 is continuously reduced is formed from the coating layer forming part 4 toward the coating layer non-forming part 5 on a boundary side between these parts 4 and 5 of the coating layer 3.

Specifically, the coating layer 3 disappears while continuously and gradually reducing its thickness from the coating layer forming part 4 toward the coating layer non-forming part 5 in a reduction rate of 0.1 to 1.5 µm/mm, and the coating layer 3 is formed in such a manner that a thickness reduction rate becomes 0.1 to 0.5 µm/mm in a range of at least 30 mm, preferably 50 mm, or more preferably 90 mm from at least a position immediate before a position where the coating layer 30 disappears in the height direction.

It is to be noted that a position at which the coating layer 3 disappears is indicated by a chain line in the drawing.

A surface of the container body 2 can be gradually seen through as the coating layer 3 which covers the surface of the container body 2 becomes thinner. Further, the container body 2 is exposed when the coating layer 3 which covers the surface of the container body 2 disappears, and hence the surface of the container body 2 can be directly seen.

In this embodiment, developing such a phenomenon in the thickness reducing portion 6 formed in the coating layer 3 produces a change in a color (a gradation change) and applies a decorative design having a higher sense of togetherness to the container itself with a high degree of freedom. In particular, a continuous gradation change is enabled by successively reducing the thickness of the coating layer 3 in the above-described reduction rate, and it is possible to effectively avoid discontinuation of the gradation change, e.g., continuation of a range having fixed darkness at a part immediately before disappearance of the coating layer 3, or loss of continuity of the gradation change between the coating layer forming part 4 and the coating layer non-forming part 5 because of discontinuity of a change in color of the coating layer 3 to a color of the container body 2.

Here, such a thickness reducing portion 6 can be formed over the entire coating layer forming part 4. That is, the above-described phenomenon can be developed over the entire coating layer forming part 4. In terms of actual manufacture, production can be facilitated by changing the thickness of the coating layer 3 over the entire coating layer 3 as will be explained later in a description of a resin pressure. Incidentally, in this case, even if the thickness of the coating layer 3 is changed at a part where the coating layer 3 has a thickness which is not thinner than a fixed value, this change cannot be recognized as a change in color tone in some cases.

It is preferable for the thickness reducing portion 6 to be formed in a range occupying ¼ or above of a length of the container base portion in the height direction, and a continuous gradation change can be thereby formed in a wide range, thus providing further excellent design properties of the resin container 1.

It is to be noted that, in a part other than the thickness reducing portion 6, the thickness of the coating layer 3 may be substantially constant or may slightly vary. A change in thickness of the coating layer 3 at a part other than the thickness reducing portion 6 does not affect an appearance of the resin container 1. A part where a change in thickness of the coating layer 3 affects the appearance of the resin container 1 is the thickness reducing portion 6.

Furthermore, when a degree of transparency of the coating layer 3 is high, how the container body 2 in a lower layer is seen is the same, and the above-described phenomenon is hard to be developed. However, if the above-described phenomenon can be developed, i.e., if how the container body 2 in the lower layer is seen can vary by a change in thickness of the coating layer 3, the coating layer 3 may have a certain degree of transparency.

Figure 17:
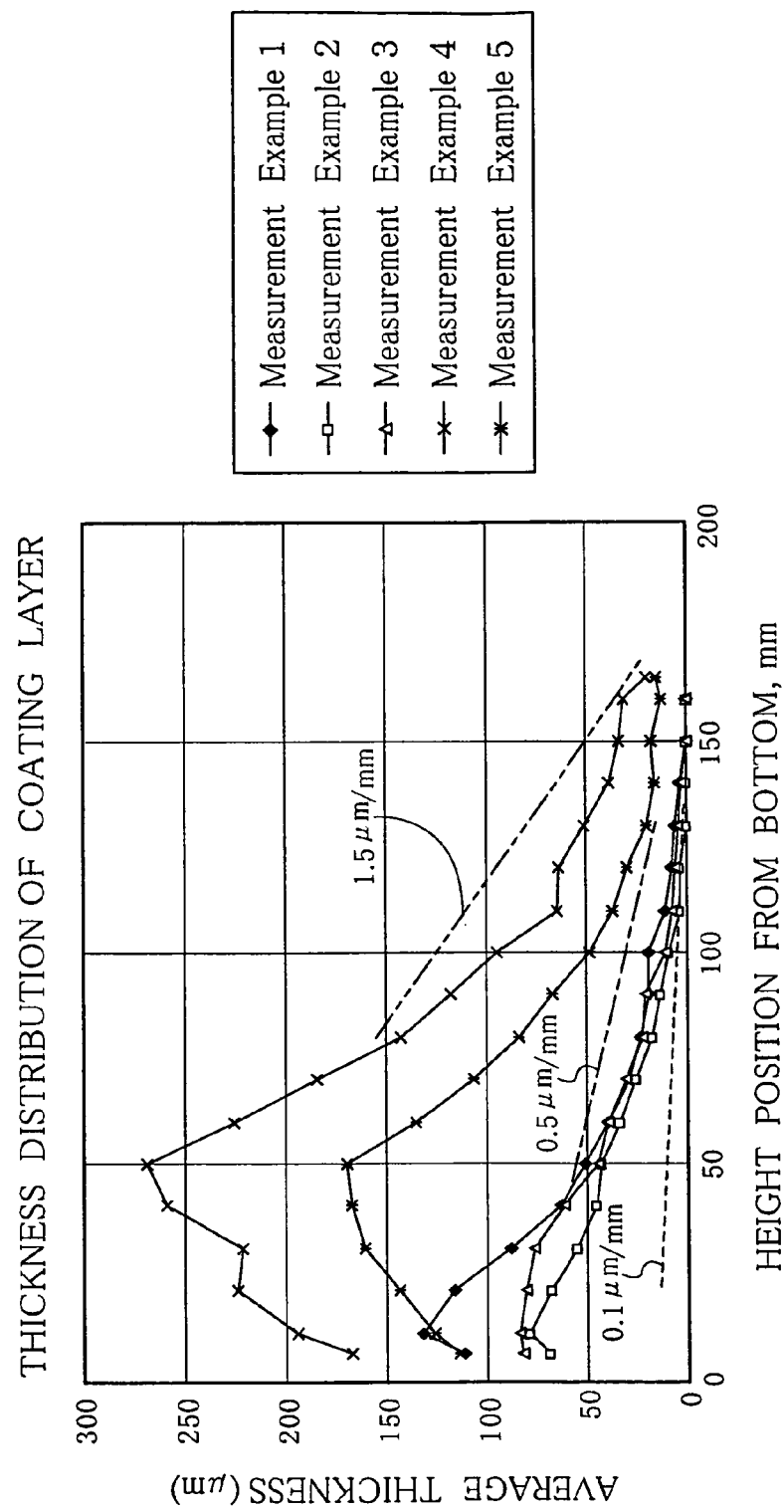
FIG. 17 is a graph showing an example of a thickness distribution of a coating layer.

Here, FIG. 17 shows examples (measurement examples 1 to 5) of a thickness distribution of the coating layer 3 when measuring the thickness of the coating layer 3 along the height direction from the bottom portion 2c side of the base portion 2b with respect to five resin containers 1 which have different color tones or changes in thickness of the coating layer 3, each resin container 1 being a target polypropylene resin multi-layered blow bottle (an interior content: 600 ml, a height: 180 mm, a shell diameter: 70 mm, and an average thickness of a base portion: 1.0 mm). In each of these resin containers 1, a color tone is uniform in a circumferential direction, and the color tone is gradually changed from a dark color to a light color from the bottom portion 2c side of the base portion 2b toward an upper side (a direction of the opening portion 2a).

It is to be noted that a horizontal axis of the graph shown in FIG. 17 represents a height position from the bottom portion 2c side of the base portion 2b, and a vertical axis of the same represents an average thickness in the circumferential direction of the coating layer 3.

In the measurement examples 1, 2 and 3 shown in FIG. 17, the coating layer 3 completely disappears at an upper part of the resin container 1 and the container body 2 is exposed on the surface. On the other hand, in the measurement examples 4 and 5, the coating layer 3 becomes thinner toward the upper side but it does not completely disappear.

Furthermore, in each of the resin containers 1 in the measurement examples 1 to 5, a gradation change in color tone can be obtained. Moreover, the color tone change is continuous, and the color tone is not suddenly discontinued. However, comparing the resin containers 1 in the measurement examples 1, 2 and 3 with the resin containers 1 in the measurement examples 4 and 5, the coating layer 3 remains even in the upper part in each of the resin containers in the measurement examples 4 and 5, and a pure color tone of the container body 2 does not appear, and hence a desired color tone change cannot be necessarily obtained in some cases depending on combinations of colors of the coating layer 3 and the container body 2. On the contrary, in each of the resin containers 1 in the measurement examples 1, 2 and 3, the thickness reduction rate of the coating layer 3 is set to 0.1 to 0.5 μm/mm in a range of at least 30 mm, preferably 50 mm, or more preferably 90 mm from a position immediately before the part where the coating layer 3 disappears in the height direction, thereby realizing a continuous and smooth gradation change of the coating layer 3 which is continuous with the color tone of the container body 2.

It is to be noted that, in FIG. 17, although a straight line of an inclination representing a reduction rate of 0.1 μm/mm is indicated by a chain line, a straight line of an inclination representing a reduction rate of 0.5 μm/mm is indicated by an alternate long and short dash line and a straight line of an inclination representing a reduction rate of 1.5 μm/mm is indicated by an alternate long and two short dashes line, as can be seen from these lines, the thickness of the coating layer 3 is reduced in the reduction rate of 0.1 to 1.5 μm/mm along the height direction of the resin container 1 in the measurement examples 1 to 5, and the thickness of the coating layer 3 varies in the reduction rate of 0.1 to 0.5 μm/mm in the measurement examples 1, 2 and 3.

Additionally, when a degree of a color tone change was confirmed by measuring (a Lab system) a color difference, each of the resin containers 1 has a color difference of $\Delta E=15$ or above between the darkest part (the thickest part of the coating layer 3) and the fairest part (a data plot portion at a right end in FIG. 17). In terms of a position in the height direction in FIG. 17, the part of $\Delta E=15$ is a position which is approximately 90 mm above the bottom portion 2c side of the base portion 2b in the resin container 1 in each of the measurement examples 1 to 5. Therefore, based on FIG. 17 and the color difference measurement result, it can be understood that a change in thickness reduction rate of the coating layer 3 in each of the measurement examples 1, 2 and 3 falls within a range of 0.1 to 0.5 μm/mm in which the color difference varies to $\Delta E=15$ with the position where the coating layer 3 disappears in the height direction as a reference.

It is to be noted that the thickness of the coating layer 3 greatly differs between the measurement examples 1, 2 and 3 and the measurement examples 4 and 5 even in the same color tone change. For example, the thickness of the coating layer 3 is not greater than 50 μm at the height position of 90 mm where the change of $\Delta E=15$ is observed in the former examples, whereas the thickness of the same is approximately 80 to 140 μm in the latter examples. This difference is caused due to a difference in content of a pigment included in the coating layer 3. When a content of the pigment is large, the thickness of the coating layer 3 can be reduced.

In this embodiment, specifically, a color can be changed in the following manner. That is, in the example shown in FIG. 1, the container body 2 is formed of a base material resin in which a coloring material such as an arbitrarily selected pigment is added. As a result, the arbitrary color is given to the container body 2.

On the other hand, the coating layer 3 is formed of a sub-material in which a coloring material different from that added in the base material resin, e.g., a coloring material which has a similar color but a darker color tone is added. That is, a color which has a similar color and a relatively fair color tone is given to the container body 2, and a color which has a similar color and a relatively dark color tone is given to the coating layer 3.

As described above, the thickness reducing portion 6 in which the thickness is gradually reduced toward the coating layer non-forming part 5 is formed in the coating layer 3. When the thickness of the coating layer 3 is reduced, the surface of the container body 2 can be seen through the coating layer 3. Therefore, as the coating layer 3 becomes thinner, the color tone of the container body 2 demonstrably appears and, on the other hand, the dark color tone of the coating layer 3 is gradually weakened. Further, when the coating layer 3 disappears, at this position, i.e., the coating layer non-forming part 5, the color of the container body 2 itself is observed on the surface of the resin container 1. As a result, when the resin container 1 is seen from the lower side toward the upper side along the height direction, there can be observed such a change in color (a change in shading) at the thickness reducing portion 6 as the color having the dark color tone of the coating layer 3 is gradually changed to the fair color tone and finally tuned to the fair color tone of the container body 2.

In this embodiment, a color can be changed by using coloring materials having different colors as well as using coloring materials of similar colors having different color tones.

For example, a bluish coloring material is added to the base material resin forming the container body 2, and a reddish coloring material is added to the sub-material forming the coating layer 3. As a result, when the resin container 1 is seen from the lower side toward the upper side along the height direction, there can be observed such a change in color (a change in hue) at the thickness reducing portion 6 as the reddish color of the coating layer 3 is gradually weakened and, on the other hand, a bluish color strongly appears and finally turns to the bluish color of the container body 2.

It is to be noted that the container body 2 may be formed without adding a coloring agent to the base material resin in this embodiment.

Such a change in color in this embodiment is observed as a change in color of the resin container 1 itself. Therefore, a decorative design having a high sense of togetherness can be applied to the resin container 1.

It is to be noted that, when the coloring material added to the base material resin is counterchanged with the coloring agent added to the sub-material, a reverse change in color can be observed along the same direction as that described above. Furthermore, although not shown, both the lower portion and the upper portion of the container body 2 may be covered with the coating layer 3 except a substantially central portion of the container body 2 in the height direction. At this time, both the upper and lower coating layers 3 may have the same color or different colors. When the same color is given to these layers, a symmetrical change in color can be expressed in the vertical direction along the same direction as that described above.

Here, in the example shown in FIG. 1, the total thickness of the container itself including the part where the thickness reducing portion 6 is formed is maintained substantially constant, but the total thickness of the part where the thickness reducing portion 6 is formed may be changed. For example, the thickness of the base material resin layer of the container body 2 may be maintained constant, and the coating layer 3 may be formed on the container body 2. The above-described change in color can be generated as long as the coating layer 3 is formed in such a manner that it disappears while gradually reducing its thickness toward the coating layer non-forming part 5.

In case of changing the thickness of the part where the thickness reducing portion 6 is formed, it is preferable to set this change in such a manner a sense of togetherness of the resin container 1 and a decorative design applied to the resin container 1 is not deteriorated, e.g., that the container body 2 and the coating layer 3 are formed at substantially the same level on the surface of the resin container 1.

In order to readily realize a decorative design having a high sense of togetherness, it is preferable for the thickness of the container itself to be maintained substantially constant at the part where the thickness reducing portion 6 which generates a change in color is formed. More preferably, the total thickness of at least the base portion 2b of the container body 2 is maintained substantially constant irrespective of the coating layer forming part 4 or the coating layer non-forming part 5. As a result, a container shape itself can be equal to that of a similar container which is usually utilized.

Moreover, in the example shown in FIG. 1, a boundary between the container body 2 and the coating layer 3 is clearly expressed in the cross section for the convenience's sake. However, actually, the boundary between them is not clearly formed in some cases. That is, the base material resin forming the container body 2 and the sub-material forming the coating layer 3 are partially mixed with each other.

In particular, in case of manufacturing the resin container 1 by later-described blow molding, the base material resin and the sub-material join together in a molten state in a die head. Therefore, by adjusting solubility of both materials, various conditions for forming a parison (e.g., a degree of surface solidification of the base material resin at the time of joining) and others, the base material resin and the sub-material can be mixed and molten at a contact interface between the base material resin and the sub-material when forming a parison. Performing blow molding with respect to the parison which is in a state where the base material resin and the sub-material are mixed at their contact interface can prevent the boundary between the container body 2 and the coating layer 3 from being clearly formed.

In this manner, when a mixed and molten state of the base material resin and the sub-material is appropriately adjusted so that the boundary between the container body 2 and the coating layer 3 is not clearly formed, a color can change in many ways as compared with a case where a change in color is expressed by a monotonous variation in thickness of the coating layer 3.

Additionally, in this embodiment, when the position where the coating layer 3 disappears is microscopically observed, it is preferable to form the position where the coating layer 3 disappears in such a manner that this position appears randomly but not continuously (e.g., not linearly). That is, when a part immediately before the position where the coating layer 3 disappears is linearly traced and observed, it can be confirmed that the coating layer 3 remains at some positions, but it is preferable that both such a state and another state in which the coating layer 3 has already disappeared exist at some positions. As a result, a further continuous gradation change in color can be expressed.

Further, when the position where the coating layer 3 disappears is continuous, there can be observed a stripe-like discontinuous change in color along the position where the coating layer 3 disappears (e.g., as indicated by a chain line in FIG. 1) in some cases. That is, when the color is continuously changed in the thickness reducing portion 6 but this change is not continuous with the color of the container body 2 at the coating layer non-forming part 5, this discontinuity is observed in the form of a stripe. The above-described conformation is also effective in avoiding occurrence of such a stripe. Such a conformation can be realized by appropriately setting conditions when forming a parison by later-described blow molding or performing a drawing step for the parison.

Although the resin container 1 according to this embodiment can be manufactured by blow-molding a parison extruded from an extruder, immediately subjecting the parison extruded from the extruder to melt-blow molding is preferable in terms of thermal profitability.

As the resin used to manufacture the resin container 1, it is possible to use a thermoplastic resin which is usually utilized for this type of resin containers, e.g., polyethylene terephthalate, polyethylene, polypropylene, polystyrene and others or a combination of these materials and ethylene-vinylalcohol copolymer, polyamide, cyclic olefin, polyester, modified polyethylene and others, but it is preferable for the base material resin forming the container body 2 or the sub-material forming the coating layer 3 to have MI which falls within a range of 0.1 to 30 g/10 min considering moldability. In particular, when MI of the sub-material is set to this range, control over a change in thickness of the coating layer 3 can be facilitated. Furthermore, as the coloring material, it is possible to utilize various kinds of organic, inorganic or photoluminescent pigments, various kinds of dyes and others.

Although the base material resin and the sub-material can have different properties by adding the different coloring materials to the base material resin and the sub-material in this embodiment, the base material resin and the sub-material may appropriately have different types or grades of resins as well. For example, various physical properties, e.g., mechanical strength of the container body 2 may be different from those of the coating layer 3.

It is to be noted that a resin whose properties are different from those of the base material resin is used as the sub-material forming the coating layer 3 in the present invention, but it is good enough for such a sub-material to have any property different from that of the base material resin in accordance with a purpose of forming the coating layer 3, and it is possible to use, e.g., a resin which is of the same type as the base material resin but has a different coloring state, or a resin which is of a different type from the base material resin and has a different coloring state, a resin having a composition, physical properties, an additive and others which are different from those of the base material resin.

Figure 2A:
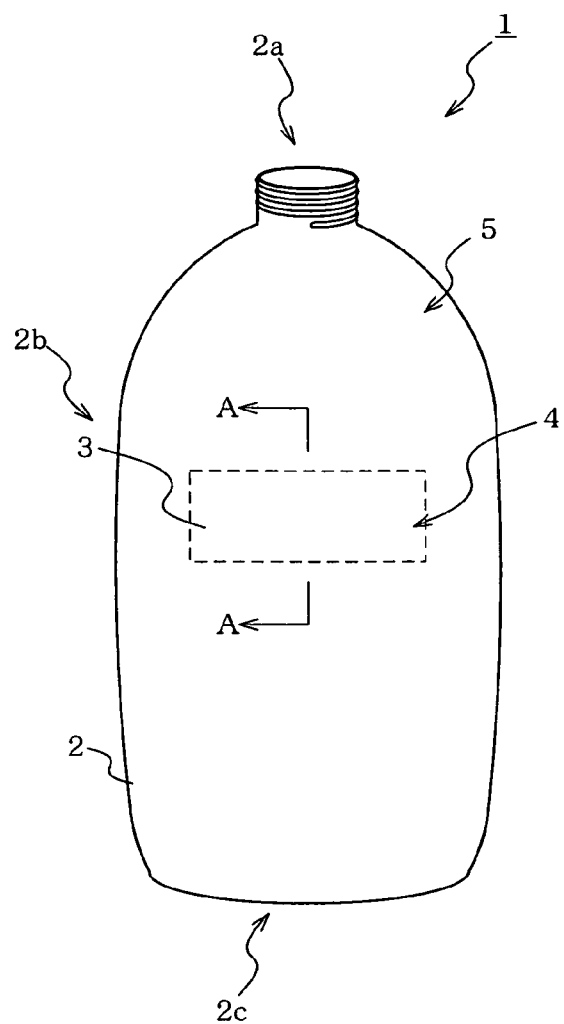
FIGS. 2(a), 2(b) are a front view and a primary part cross-sectional view showing outlines of a first modification of the first embodiment according to the present invention.
Figure 2B:
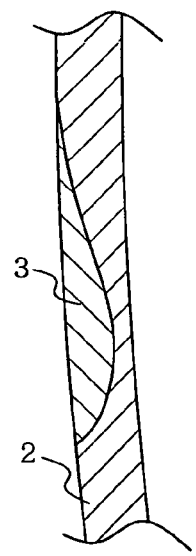
Figure 3:
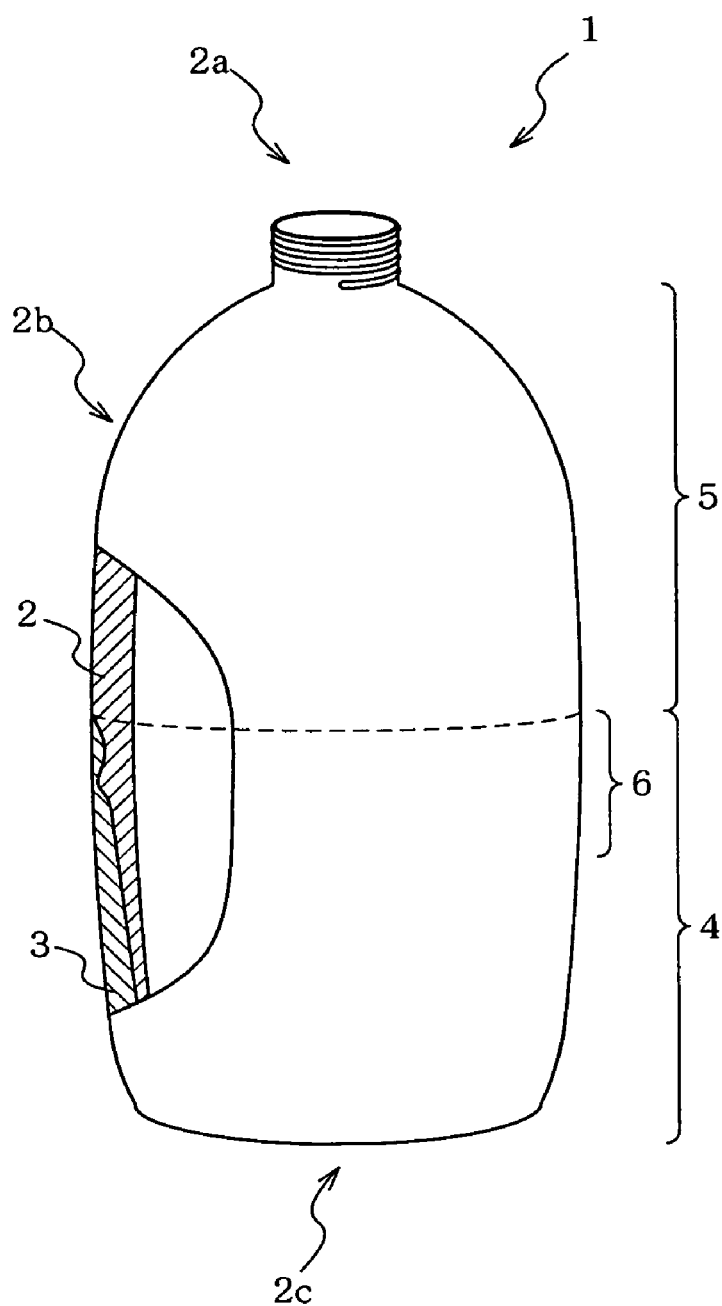
FIG. 3 is a partially cutaway cross-sectional view showing an outline of a second modification of the first embodiment according to the present invention.
Figure 4A:
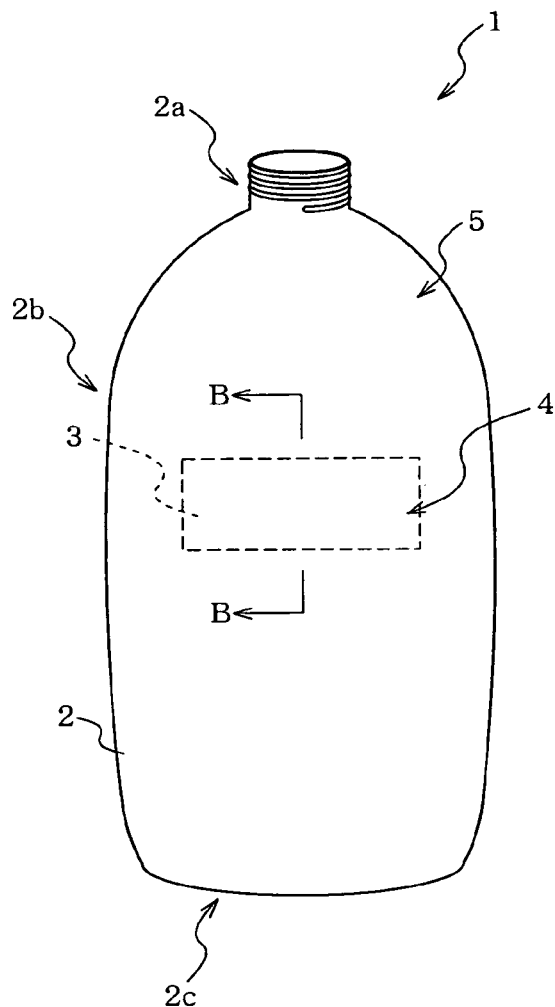
FIGS. 4(a), 4(b) are a front view and a primary part cross-sectional view showing outlines of a third modification of the first embodiment according to the present invention.
Figure 4B:
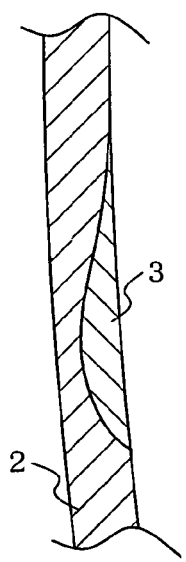
Figure 5:
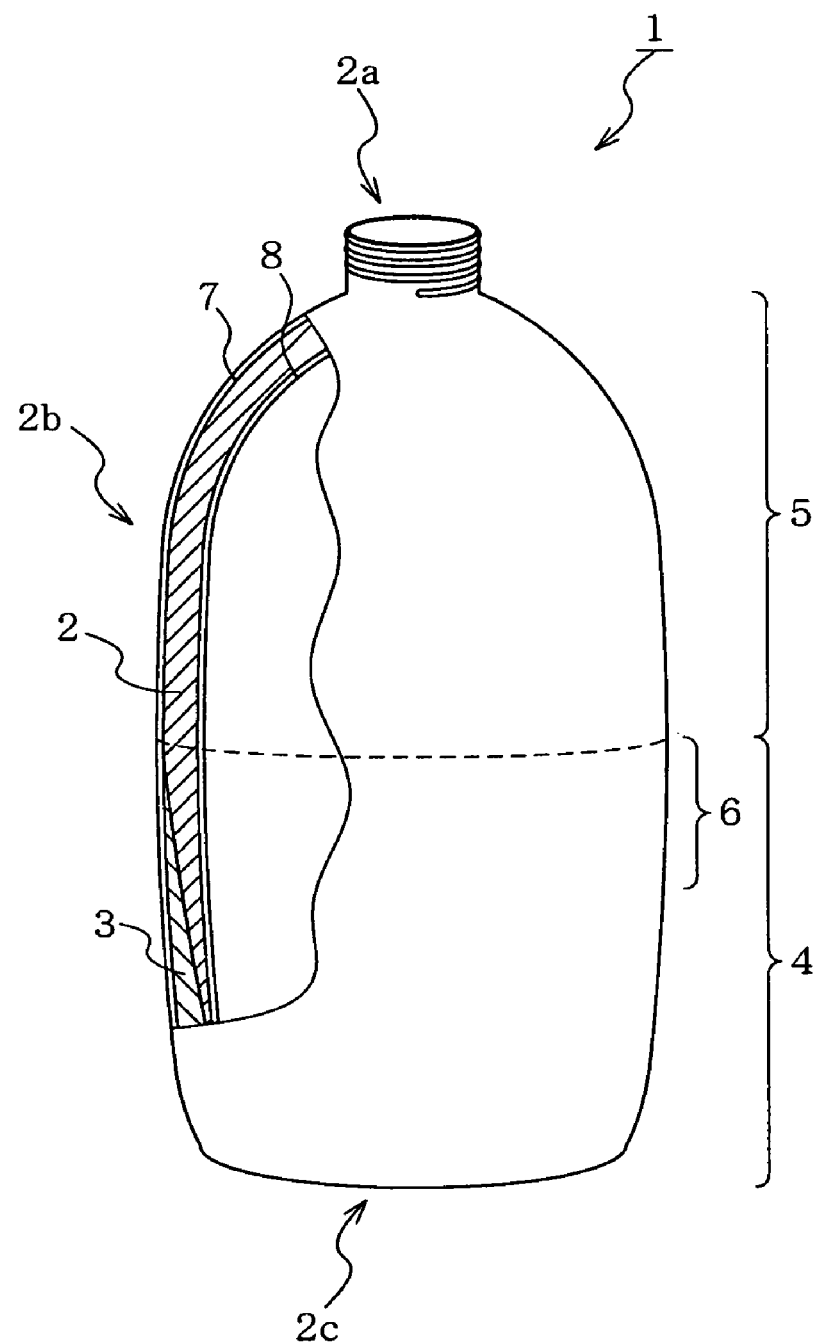
FIG. 5 is a partially cutaway cross-sectional view showing an outline of a fourth modification of the first embodiment according to the present invention.
Figure 6:
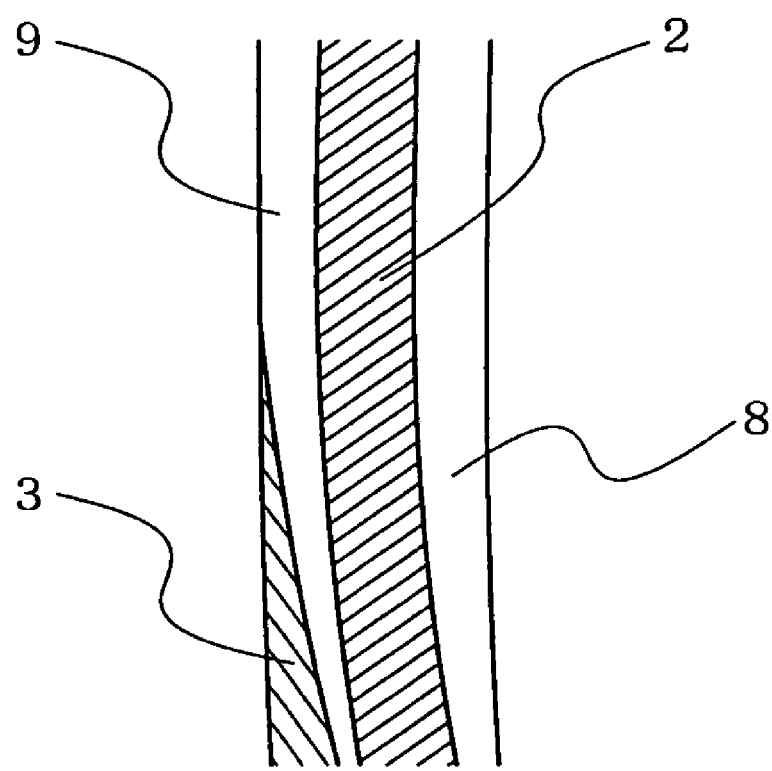
FIG. 6 is an enlarged cross-sectional view of a part corresponding to a part surrounded by a chain line in FIG. 1, showing an outline of a fifth modification of the first embodiment according to the present invention.

Modifications of this embodiment will now be described with reference to the accompanying drawings. FIGS. 2(a), 2(b) show outlines of a first modification, in which FIG. 2(b) is a cross-sectional view taken along a line A-A depicted in FIG. 2(a). FIG. 3 shows an outline of a second modification and is a partially cutaway cross-sectional view in which a resin container 1 is partially cut away. FIGS. 4(a), 4(b) show outlines of a third modification, in which FIG. 4(b) is a cross-sectional view taken along a line B-B depicted in FIG. 4(a). FIG. 5 shows an outline of a fourth modification and is a partially cutaway cross-sectional view in which a resin container 1 is partially cut away. FIG. 6 shows an outline of a fifth modification and is an enlarged cross-sectional view of a part corresponding to a portion surrounded by the chain line depicted in FIG. 1.

Although the coating layer 3 is formed on the part extending from a part below the substantially central portion of the base portion 2b in the height direction and the bottom portion 2c in the example shown in FIG. 1, the coating layer 3 is not restricted to one formed in such a conformation. For example, like the first modification depicted in FIGS. 2(a), 2(b), a rectangular coating layer 3 may be formed at an arbitrary position on a side surface (a base portion 2b) of a resin container 1. Although not shown, as a shape of the coating layer 3, it is possible to adopt an arbitrary shape, e.g., any other polygonal shape such as a triangular shape, a circular shape, a star shape, a stripe shape and others besides the illustrated shape. A position, a size and a range of the coating layer 3 formed on the resin container 1 can be appropriately selected as required. If a coating layer non-forming part 5 exists, a substantially entire surface of the container body 2 may be covered with the coating layer 3. That is, the modification is within the scope of this embodiment as long as a thickness reducing portion 6 in which the coating layer 3 disappears while gradually reducing its thickness in the above-described rate exists.

Moreover, the coating layer 3 is not restricted to the conformation in which its thickness is monotonously reduced in the thickness reducing portion 6. For example, like the second modification shown in FIG. 3, a change in thickness may be repeated in such a manner that the thickness is reduced, then the thickness is increased and the thickness is again reduced, for example. As a result, how a color is repeatedly changed can be expressed.

As such a coating layer 3, not only one type but also a plurality of coating layers having different shapes, sizes, colors and others may be formed, and a color pattern may be constituted by using combinations of such coating layers.

Additionally, the coating layer 3 is not restricted to the case where it appears on the surface side of the resin container 1. Like the third modification shown in FIGS. 4(a), 4(b), it can be formed on an inner surface side of a resin container 1. In this case, the coating layer 3 does not affect an appearance of the resin container 1 at a part where a thickness of the coating layer 3 is small and a thickness of a container body 2 is relatively large. On the other hand, the coating layer 3 can be seen through the container body 2 at a part where the thickness of the coating layer 3 is large and the thickness of the container body 2 is relatively small. Therefore, when the coating layer 3 is formed in such a conformation, a color or the like of the coating layer 3 can be lightly observed on the surface side of the resin container 1 as the thickness of the coating layer 3 is increased.

As a result, a slight change in color can be expressed. Further, when the thus formed coating layer 3 is appropriately combined with the coating layer 3 formed on the surface side of the resin container 1, a color pattern having a high degree of freedom can be constituted. In this case, the container body 2 can be provided with a certain degree of transparency like the coating layer 3 formed on the surface side of the resin container 1.

The thus configured color pattern can be combined with transfer of an irregular shape on an inner surface of a metal mold, appropriate irregular shape enlargement processing such as embossing, or printing such as screen printing.

Furthermore, like the fourth modification shown in FIG. 5, an outer layer 7 such as a clear layer can be appropriately formed on a surface of a resin container 1. Moreover, an inner layer 8 such as a gas barrier layer can be formed on an inner surface of the same as required.

Additionally, like the fifth modification shown in FIG. 6, a resin container 1 may be provided with a color tone adjusting layer 9 on an outer surface side of a container body 2, and a coating layer 3 may be formed on an outer surface side of this color tone adjusting layer 9. In this case, as illustrated, an innermost surface of the resin container 1 may be provided with an inner layer 8.

Although the color tone adjusting layer 9 is covered with the coating layer 3 at a coating layer forming part 4, it is exposed to the outside at a coating layer non-forming part 5 and appears on an appearance of the resin container 1 together with the coating layer 3. Therefore, the color tone adjusting layer 9 can be used to adjust color tones of the container body 2 and the coating layer 3.

For example, in case of giving a pearly sense to the resin container 1, a pearl pigment can be contained in the coating layer 3 and the color tone adjusting layer 9. Further, in case of giving a shiny sense, each of the coating layer 3 and the color tone adjusting layer 9 can be formed of a material having the shiny sense. Furthermore, when a material in which a recycled resin obtained by crushing and recycling a defectively molded resin container 1 or burrs is mixed in a virgin resin is used as the base material resin forming the container body 2, a pigment contained in the color tone adjusting layer 9 or a material to be used can be appropriately selected to adjust a color tone of the container body 2.

Moreover, in case of generating a gradation change by adding the color tone adjusting layer 9, it is preferable for changes in thickness of the coating layer 3 and the color tone adjusting layer 9 along the height direction to have a reverse relationship at a part where the thickness reducing portion 6 is formed. That is, it is preferable that the thickness of the coating layer 3 is relatively reduced along the height direction whereas the thickness of the color tone adjusting layer 9 is relatively increased and, on the contrary, the thickness of the coating layer 3 is relatively increased whereas the thickness of the color tone adjusting layer 9 is relatively reduced. According to such a structure, a continuous gradation change can be generated based on combinations of respective colors of the container body 2, the coating layer 3 and the intermediate layer.

Additionally, although the resin forming the color tone adjusting layer 9 is not restricted, it is preferable to form the color tone adjusting layer 9 by using the same resin as that of the coating layer 3 considering printability when printing the surface of the resin container 1.

As described above, in this embodiment, a change in color can be expressed on the surface of the resin container 1 by using only a change in thickness of the coating layer 3 integrally formed with the container body 2.

As a result, it is possible to apply a decorative design using a color or a coloring pattern to the container itself with a high degree of freedom. Further, since the obtained decorative design is realized by the coating layer 3 which is integrally formed with the container body 2, the decorative design with a high sense of togetherness with the container can be provided. As a result, a high value can be added to the container, thereby obtaining the resin container which greatly appeals to consumers.

A manufacturing apparatus of a resin container according to the present invention which is preferable for producing such a resin container will now be described with reference to the accompanying drawings, and a manufacturing method of a resin container according to the present invention will be also explained.

Figure 7:
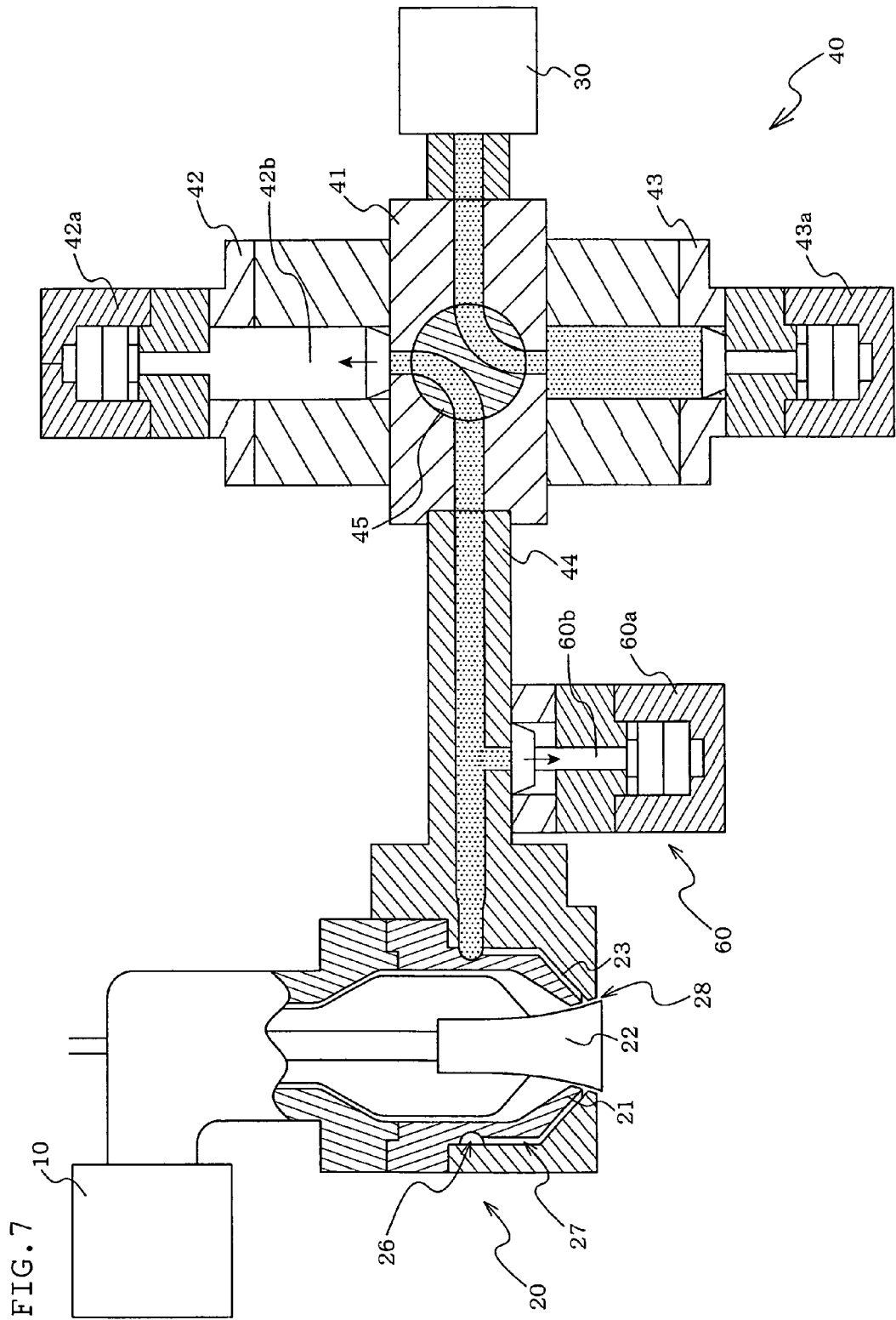
FIG. 7 is a schematic cross-sectional view showing an embodiment of a manufacturing apparatus of a resin container according to the present invention.

FIG. 7 is a schematic cross-sectional view showing an embodiment of a manufacturing apparatus of a resin container according to the present invention. A main extruder 10 heats, fuses and extrudes a base material resin forming a container body 2, and continuously supplies this resin to a die head 20 in accordance with a molding cycle. The die head 20 adjusts a gap between a shell 21 and a core 22 as required in accordance with a command based on a parison control program from a non-illustrated control portion. As a result, a parison is extruded with a predetermined thickness from a slit portion 28 opened between the shell 21 and the core 22.

A discharge portion 23 which supplies a sub-material forming a coating layer 3 into the die head 20 is provided to the shell 21. The discharge portion 23 is provided in the vicinity of the slit portion 28 opened between the shell 21 and the core 22 on an end side of the die head 20, preferably within a range of 5 mm or below from the end of the die head 20 in such a manner that the sub-material joins a base material resin supplied from the main extruder 10 immediately before the parison is extruded. As a result, the parison can be extruded with a substantially fixed thickness irrespective of whether the sub-material is added to the parison. Further, there is almost no disarray of the sub-material in a circumferential direction of the parison since the parison is extruded from the slit immediately after discharging the sub-material, thereby manufacturing a resin container 1 superior in design and functions.

The discharge portion 23 may be opened along an entire circumference of the core 22 so that the sub-material is added to an entire circumference of the parison. As a result, the coating layer 3 can be formed in such a conformation as the resin container 1 shown in FIG. 1. Furthermore, the sub-material may be added from a part (one position or a plurality of positions) of the entire circumference surrounding the core 22. Specifically, it is good enough to partially close the discharge portion 23 which is opened on the entire circumference of the core 22 by using an appropriate closing member. As a result, the rectangular or strip-shaped coating layer 3 can be formed.

Figure 10:
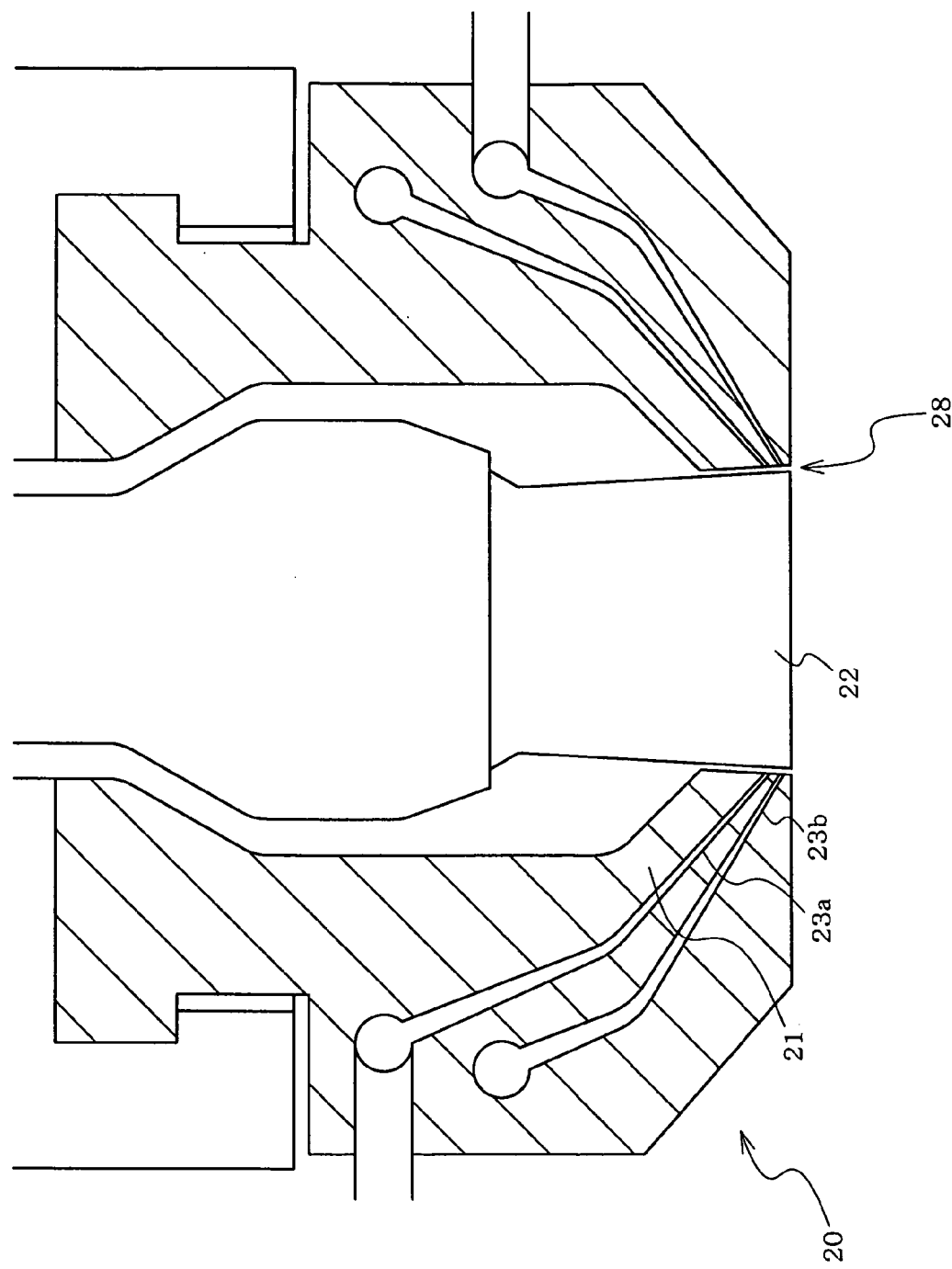
FIG. 10 is a schematic cross-sectional view showing a modification of a die head in an embodiment of a manufacturing apparatus of a resin container according to the present invention.

Moreover, as shown in FIG. 10, discharge portions 23a and 23b can be provided on two stages in a direction of extruding the parison. In this case, two types of sub-materials having different properties may be supplied from the discharge portions 23a and 23b, or the sub-materials having the same properties may be supplied from the same. According to such a conformation, a later-described sub-extruder 30 can be provided in accordance with each of the discharge portions 23a and 23b.

Additionally, the sub-material forming the coating layer 3 may be supplied from the discharge portion 23a, and a material forming the above-described clear layer 7 or the like may be supplied from the discharge portion 23b. Although not shown, in case of forming the clear layer 7 or the like on the surface of the parison, the die head 20 can be configured in such a manner that the material forming the clear layer 7 or the like on the surface of the parison is supplied immediately after or after extruding the parison.

It is to be noted that providing the plurality of sub-extruders 30 in accordance with the plurality of discharge portions 23 can supply more types of the sub-materials.

Figure 11:
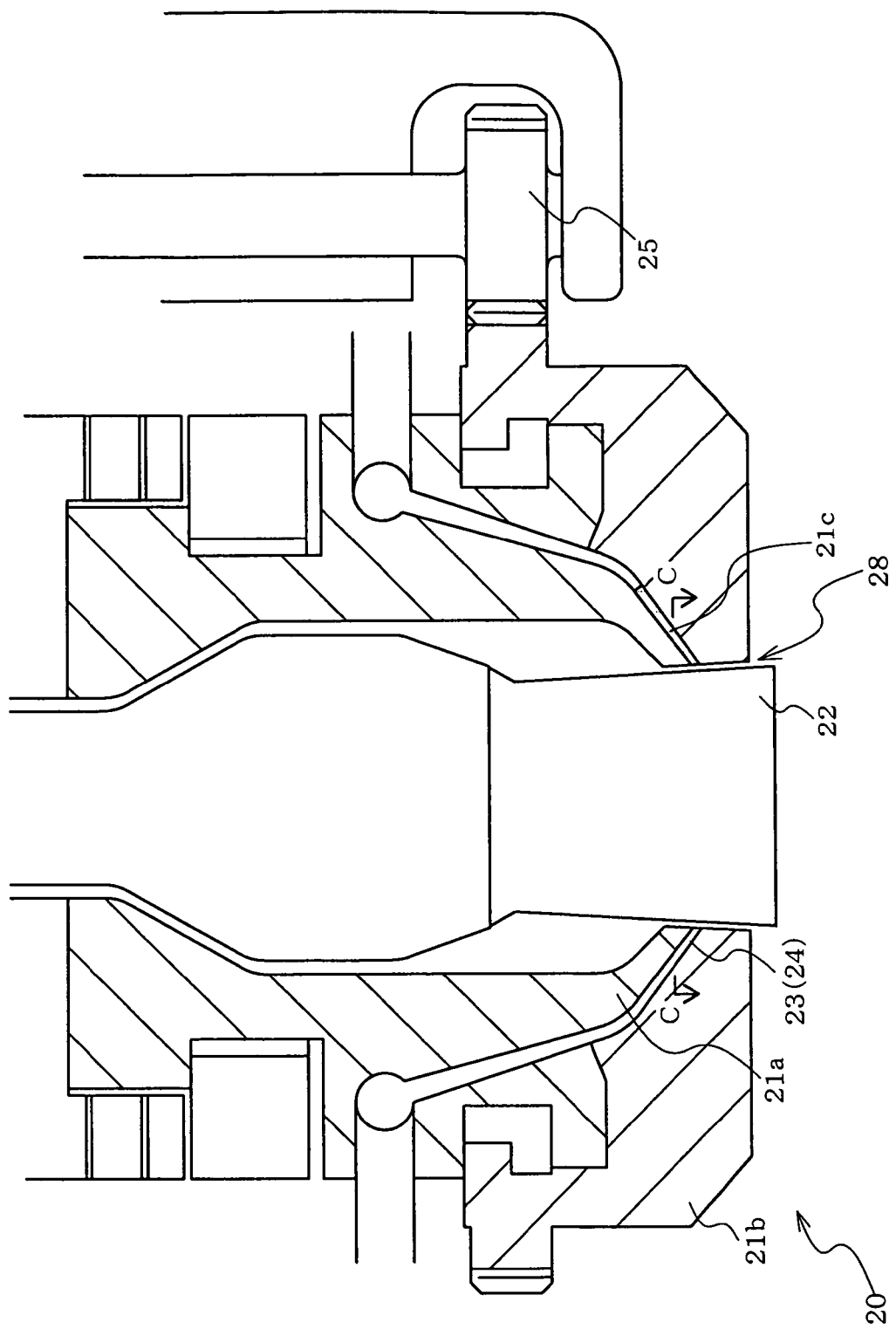
FIG. 11 is a schematic cross-sectional view showing another modification of the die head in the embodiment of the manufacturing apparatus of a resin container according to the present invention.

The specific configuration of the die head 20 is not particularly restricted as long as the discharge portion 23 is provided in such a manner that the base material resin and the sub-material join in the die head 20 as described above. Besides the above-mentioned configuration, a rotary die head 20 such as shown in FIG. 11 can be adopted. This has a configuration in which the slit-shaped discharge portion 23 (a slit 24) rotates around the core 22.

Figure 12:
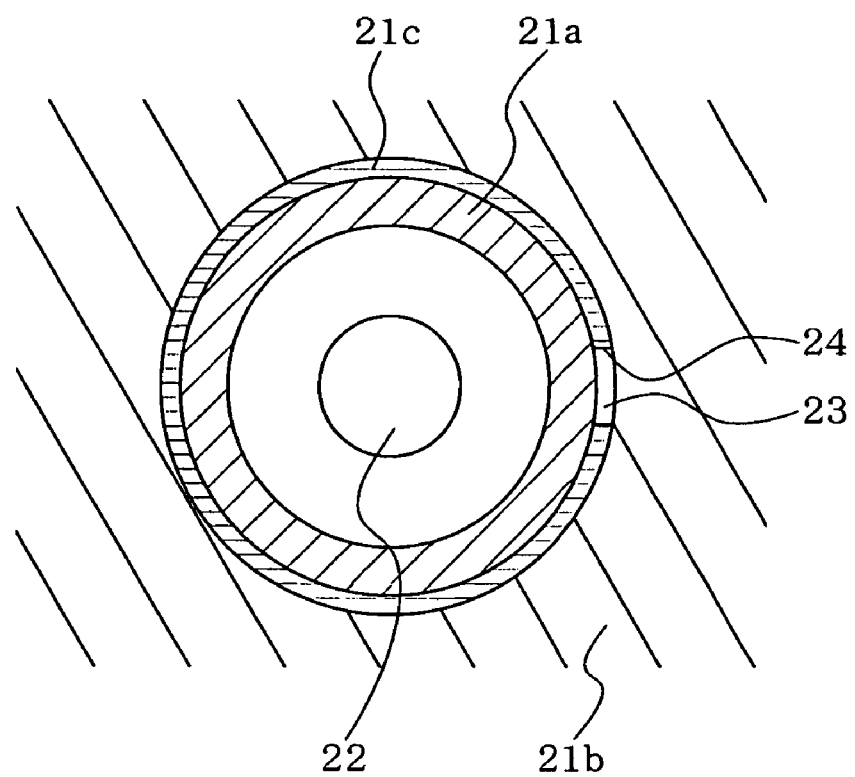
FIG. 12 is a cross-sectional view taken along a line C-C depicted in FIG. 11.

Specifically, the die head 20 is configured as follows. A fixed die portion 21a and a rotary die portion 21b constitute the die head 20, and the discharge portion 23 is formed by utilizing a gap between these portions. As shown in FIG. 12 (a cross-sectional view taken along a line C-C in FIG. 11), a part of the discharge portion 23 is closed by a closing member 21c. The closing member 21 is integrally provided to the rotary die portion 21b. As a result, the slit 24 is formed. The plurality of slits 24 may be provided. The rotary die portion 21b rotates around the core 22 by a gear 25 which rotates by a non-illustrated driving source. According to this rotation, the slit 24 rotates around the core 22. When such a rotary die head 20 is used, controlling its rotation can form the coating layer 3 in a more complicated shape.

Further, the sub-material supplied to the die head 20 reaches the discharge portion 23 through an annular portion 26 formed to surround the entire circumference of the core 22 and a cone-shaped portion 27 constituted of a gap formed into a substantially conical shape which is continuous with the discharge portion 23 from this annular portion 26 (see FIG. 7). More specifically, the sub-material flows into the cone-shaped portion 27 while filling the annular portion 26, and is supplied to the discharge portion 23.

Therefore, when the discharge portion 23 is opened on the entire circumference of the core 22, a timing at which the sub-material is discharged may deviate in some cases depending on a part which is opened on the right-hand side of the core 22 in FIG. 7 and close to a later-described communicating path 44 through which the sub-material is supplied to the die head 20 and a part which is opened on the left-hand side apart from the communicating path 44. That is, discharge of the sub-material from the part which is opened on the left-hand side is delayed as compared with the part which is opened on the right-hand side.

Such a timing deviation can be eliminated by inclining the annular portion 26 toward the lower left side in FIG. 7 with respect to a level plane in such a manner that the annular portion 26 relatively approximates the discharge portion 23 as distanced from the side where the sub-material is supplied, but the following means can be adopted to solve this problem in place of or in addition to the former method. That is, the sub-material can be set to evenly flow to the cone-shaped portion 27 on the entire circumference of the annular portion 26 after the annular portion 26 is filled with the sub-material by, e.g., increasing a diameter of the annular portion 26, or an appropriate part of the annular portion 26 and/or the cone-shaped portion 27 can be narrowed so that a flow rate of the sub-material is adjusted in accordance with the narrowed part. Eliminating the sub-material discharge timing deviation in this manner can maintain a boundary between a coating layer forming part 4 and a coating layer non-forming part 5 in a horizontal state along the circumferential direction, but intentionally generating such a sub-material discharge timing deviation can change a shape of the coating layer 3.

Figure 13:
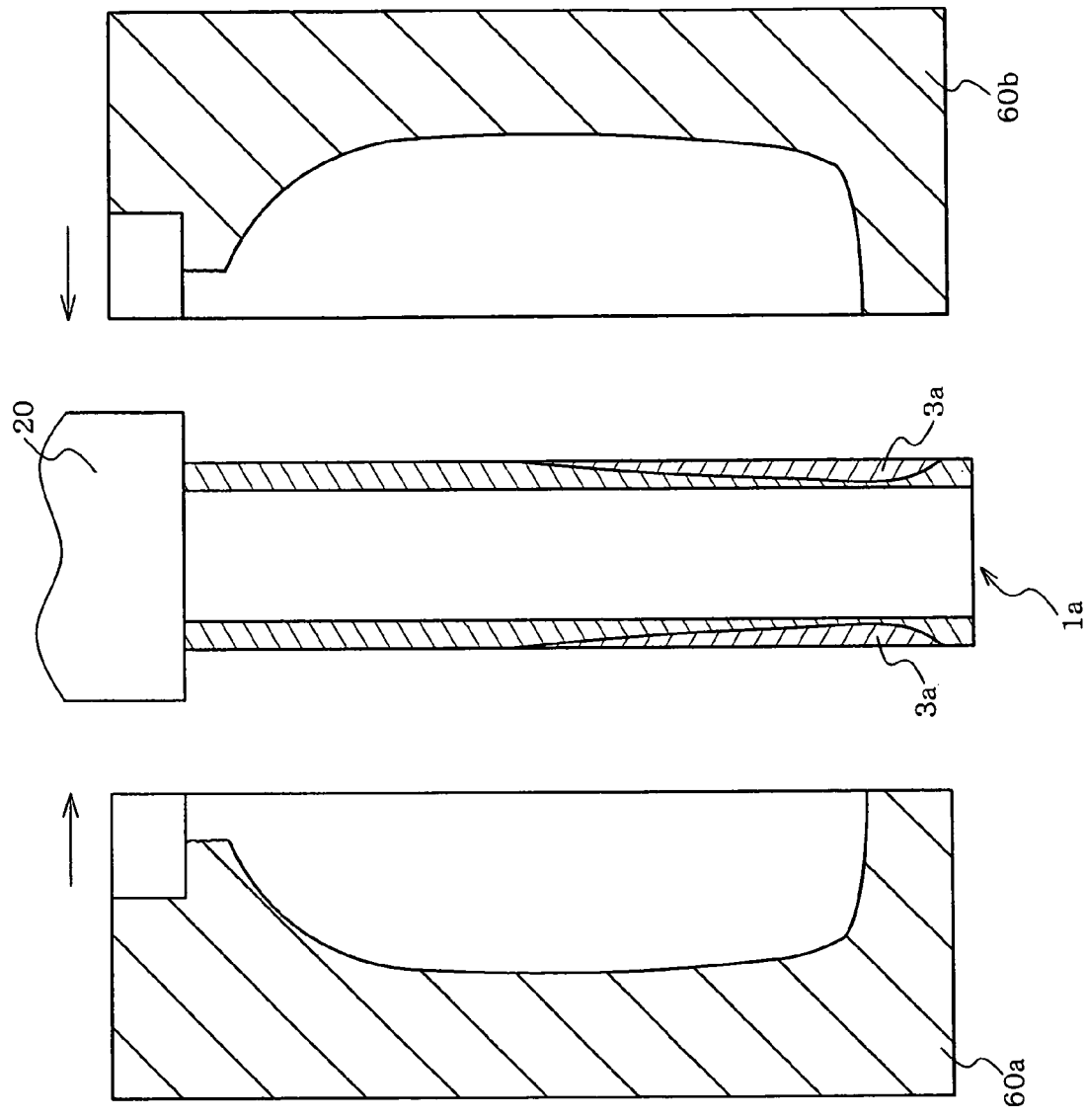
FIG. 13 is a schematic cross-sectional view showing a blow molding process in the embodiment of the manufacturing apparatus of a resin container according to the present invention.

As schematically shown in FIG. 13, a parison 1a which is extruded from the die head 20 and to which a sub-material 3a forming the coating layer 3 is added at a predetermined position is fed to a position between a pair of metal molds 60a and 60b. When the parison 1a is supplied to the position between the metal molds 60a and 60b, the metal molds 60a and 60b move in a direction indicated by an arrow in the drawing, thereby effecting a mold fastening operation. After completion of the mold fastening operation, pressurized air is blown into the metal molds to perform blow molding. As a result, there can be obtained the hollow resin container 1 in which the coating layer 3 covering a part of the container body 2 is formed integrally with the container body 2.

It is to be noted that supply of the base material resin from the main extruder 10 is appropriately controlled in accordance with a molding cycle, but supply of the base material resin from the main extruder 10 is controlled in synchronization with a molding timing in case of performing blow molding immediately after extrusion of the parison.

In the illustrated example, the metal molds 60a and 60b are set in such a manner that a downstream side of extrusion of the parison 1a becomes the bottom side of the container. The top side and the bottom side of the metal molds 60a and 60b may be inverted depending on a decorative design applied to the resin container 1. That is, although not shown, the metal molds 60a and 60b may be set in such a manner that an upstream side of extrusion of the parison 1a becomes the bottom side of the container.

For instance, the example shown in FIG. 13 assumes manufacture of the resin container 1 (see FIG. 1) in which the coating layer 3 is formed from the substantially central part to the lower side in the height direction, but inverting the top side and the bottom side of the metal molds 60a and 60b can form the coating layer 3 from the substantially central part to the upper side in the height direction. Although the top side and the bottom side of the metal molds 60a and 60b can be inverted in accordance with each lot, a rotary mechanism which can invert the top side and the bottom side of the metal molds 60a and 60b in the same lot may be provided.

Meanwhile, the example of the resin container 1 has given the description that a reverse change in color can be observed by counterchanging the coloring material added to the base material resin and the coloring agent added to the sub-material. However, since a direction of a change in thickness of the coating layer 3 remains unchanged, a completely reverse change in color cannot be obtained.

For example, viewing a shampoo container and a rinse container along the same direction, if these containers can be discriminated by observation of a completely reverse symmetrical change in color in the shampoo container and the rinse container, the reverse change in color is not sufficient. Inverting the top side and the bottom side of the metal molds 60a and 60b can reverse the direction of a change in thickness of the coating layer 3 itself. As a result, a completely reverse symmetrical change in color can be expressed, thereby sufficiently coping with the above-described case.

In the manufacturing apparatus of a resin container according to the present invention, supply of the sub-material forming the coating layer 3 is performed in accordance with each molding cycle. Specifically, the sub-material is supplied as follows.

It is to be noted that one molding cycle means a cycle from molding of one resin container 1 to molding of the next resin container 1.

In FIG. 7, the sub-material which is allowed to join the base material resin in the die head 20 is supplied from the sub-extruder 30. The sub-extruder 30 is connected with a switching portion 41, and intermittently extrudes a predetermined quantity of the molten sub-material. The switching portion 41 constitutes a part of a storage portion 40, and switches storage and supply of the sub-material by using a switching valve 45.

The sub-material extruded by the sub-extruder 30 is temporarily stored in the storage portion 40. The storage portion 40 is provided with two accumulators 42, 43. The switching valve 45 of the switching portion 41 alternately performs connection and disconnection of the sub-extruder 30 and the accumulators 42, 43 and of the accumulators 42, 43 and the communicating path 44. The communicating path 44 couples the storage portion 40 with the die head 20.

The sub-material stored in the storage portion 40 is supplied to the discharge portion 23 of the die head 20 through the communicating path 44. At this time, supply of the sub-material is alternately and intermittently performed from the two accumulators 42, 43.

Operations of the switching valve 45 and the accumulators 42, 43 are also carried out in accordance with a command based on a parison control program from a non-illustrated control portion.

Specifically, one accumulator 42 is filled with the sub-material molten and extruded from the sub-extruder 30 through the switching valve 45. Furthermore, when the base material resin is extruded from the main extruder 10 and a position at which the sub-material should join the base material resin gets close to an outlet of the die head 20, the switching valve 45 is switched based on a command from the control portion. Simultaneously, the accumulator 42 operates. Then, the sub-material filled in the accumulator 42 is supplied to the discharge portion 23 of the die head 20 through the communicating path 44. As a result, the sub-material joins the base material resin in the die head 20, and the parison having the sub-material added to a predetermined position thereof is extruded.

At this time, the switching valve 45 connects one accumulator 42 with the communicating path 44 and simultaneously connects the other accumulator 43 with the sub-extruder 30 (a state shown in FIG. 7). As a result, the sub-material extruded from the sub-extruder 30 is filled in the accumulator 43.

In this manner, the sub-material is alternately stored in the two accumulators 42, 43 from the sub-extruder 30, and a predetermined quantity of the sub-material is alternately supplied to the discharge portion 23 of the die head 20 from the accumulators 42, 43.

Here, the switching operation of the switching valve 45 is carried out by a non-illustrated cylinder, and the operations of the two accumulators 42, 43 are performed by respective cylinders 42*a* and 43*a* or the like.

At this time, adjusting operating speeds of the accumulators 42, 43 can adjust a supply speed of the sub-material, i.e., an addition quantity of the sub-material with respect to the parison.

As a result, the thickness of the coating layer 3 can be changed, but a supply speed of the sub-material must be finely adjusted in case of forming the thickness reducing portion 6 in which the thickness of the coating layer 3 is continuously reduced in the above-described reduction rate. In particular, when the coating layer 3 disappears while reducing its thickness, fine adjustment of the supply speed of the sub-material is difficult immediately before the coating layer 3 disappears, and a supply quantity of the sub-material cannot be reduced in some cases because the sub-material in the vicinity of the discharge portion 23 is drawn into a flow of the base material resin. In such a case, the thickness of the coating layer 3 cannot be reduced as intended, or the thickness of the coating layer 3 cannot be reduced and becomes large. Moreover, the sub-material which should be discharged from the discharge portion 23 stays in the vicinity of the discharge portion 23, and the thickness of the coating layer 3 is reduced more than intended in some cases.

Therefore, a range of fixed darkness continues at the part immediately before disappearance of the coating layer 3, or a change in color of the coating layer 3 is not continuous with a color of the container body 2 so that continuity of a gradation change is lost between the coating layer forming part 4 and the coating layer non-forming part 5, and the gradation change is discontinued in this manner. Such an inconvenience becomes prominent when the molding cycle is quickened in view of manufacturing efficiency.

In order to eliminate such an inconvenience, it is effective to perform suck-back control which pulls back the sub-material from the discharge portion 23 of the die head 20 by adjusting a resin pressure in a supply path, i.e., the communicating path 44 of the sub-material which is fed to the die head 20 from the sub-extruder 20 when discharging the sub-material from the discharge portion 23 of the die head 20 to join the base material resin.

In such suck-back control, it is good enough to allows the accumulators 42, 43 to function as a suck-back mechanism in such a manner that the sub-material in the communication path 44 is pulled back into the accumulators 42, 43 by supplying the sub-material from the accumulators 42, 43 and then reversely operating the respective cylinders 42*a* and 43*a*, for example.

Specifically, in the example shown in FIG. 7, the sub-material is supplied from the accumulator 42, and then a piston 42*b* is operated in a direction indicated by an arrow in the drawing to pull back the sub-material into the accumulators 42, 43.

Furthermore, when the communicating path 44 is long, a certain amount of time is required to pull back the sub-material from the discharge portion 23 of the die head 20 even though the accumulators 42, 43 function as the suck-back mechanism, and it can be considered that an effect of the suck-back control cannot be instantaneously obtained. In such a case, as shown in FIG. 7, a second suck-back mechanism 60 can be provided at a position close to the die head 20.

A specific configuration of this second suck-back mechanism 60 is not restricted as long as this mechanism can suck the sub-material in the communicating path 44 and thereby adjust a resin pressure in the communicating path 44. For example, as shown in the drawing, it is possible to adopt a configuration which operates a piston 60*b* in a direction indicated by an arrow in the drawing by a cylinder 60*a* to suck the sub-material in the communicating path 44.

The suck-back control more sensitively functions as the second suck-back mechanism 60 is provided at a position closer to the die head 20. However, a reduction rate of the resin pressure in the communicating path 44 is thereby increased, and the sub-material may be pulled back from the discharge portion 23 of the die head 20 more than necessary. Furthermore, in such a case, the thickness reduction rate of the coating layer 3 is increased, and a desired gradation change cannot be obtained in some cases.

Therefore, in this embodiment, it is preferable to perform the suck-back control using both the accumulators 42, 43 and the second suck-back mechanism 60. That is, it is preferable to combine the insensitive suck-back control by the accumulators 42, 43 with the sensitive suck-back control by the second suck-back mechanism 60, thereby greatly increasing an application range.

Although such suck-back control can be performed at an arbitrary timing in accordance with, e.g., a gradation change to be obtained, it is preferable to carry out the suck-back control at least once before the resin pressure in the communicating path 44 is reduced to 70 to 15% of a maximum resin pressure when the sub-material joins the base material resin.

When the suck-back control is effected before the resin pressure is reduced to the above-described range, there is a tendency that the sub-material is pulled back from the discharge portion 23 more than necessary. On the contrary, when the suck-back control is performed after the resin pressure is reduced beyond the above-described range, an effect of the suck-back control is hard to be obtained. As a result, it is difficult to reduce the thickness of the coating layer 3 as intended, and there is a tendency that a continuous gradation change is hardly obtained.

Additionally, by discharging the sub-material from the discharge portion 23, a resin pressure in the communicating path 44 is gradually reduced, and a reduction rate is also decreased with a reduction in the resin pressure. It is preferable to perform the suck-back control before the reduction rate per unit time of the resin pressure at this time reaches 10% or below of the maximum reduction rate, and there is also a tendency that an effect of the suck-back control is hardly obtained if this timing is missed.

Further, when the reduction rate of the resin pressure in the communicating path 44 is increased more than necessary, a quantity of the sub-material which is pulled back from the discharge portion 23 tends to become too large. Furthermore, such a tendency becomes prominent when the suck-back control using the second suck-back mechanism 60 alone is performed. In order to avoid this, it is preferable for the reduction rate of the resin pressure in the communicating path 44 after the suck-back control to be five times or below the reduction rate of the resin pressure before the suck-back control.

Therefore, in this embodiment, it is preferable to prevent a rate of change in the resin pressure after the suck-back control from becoming too large by effecting the suck-back control using both the accumulators 42, 43 and the second suck-back mechanism 60 and appropriately adjusting a quantity of sucking the sub-material (a suck-back quantity) in the communicating path 44 by each of the two suck-back mechanisms to be used.

Specifically, it is preferable to set a suck-back quantity by the second suck-back mechanism 60 to a relatively small value, perform the sensitive suck-back control by the second suck-back mechanism 60 at an initial stage of the suck-back control, and then effect the suck-back control by the accumulators 42, 43. As a result, the resin pressure in the communicating path 44 can be arbitrarily reduced while preventing the reduction rate of the resin pressure in the communicating path 44 from becoming extremely large, thereby enabling fine adjustment of a supply speed of the sub-material.

Here, FIGS. 8(a), 8(b), 8(c), 8(d) show examples of a change in the resin pressure in the communicating path 44 when the suck-back control was not performed and when the suck-back control was effected in the manufacturing apparatus depicted in FIG. 7.

Figure 8A:
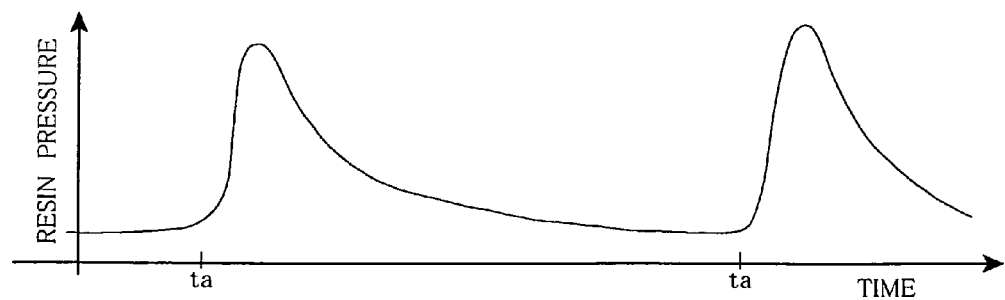
FIGS. 8(a), 8(b), 8(c), 8(d) are graphs showing an example in which a resin pressure in a supply path for a sub-material changes by suck-back control.

A graph of FIG. 8(a) shows an example of a change in the resin pressure in the communicating path 44 when the suck-back control was not performed. It is to be noted that the resin pressure was measured at a part of the communicating path 44 in the vicinity of the die 20.

Figure 8B:
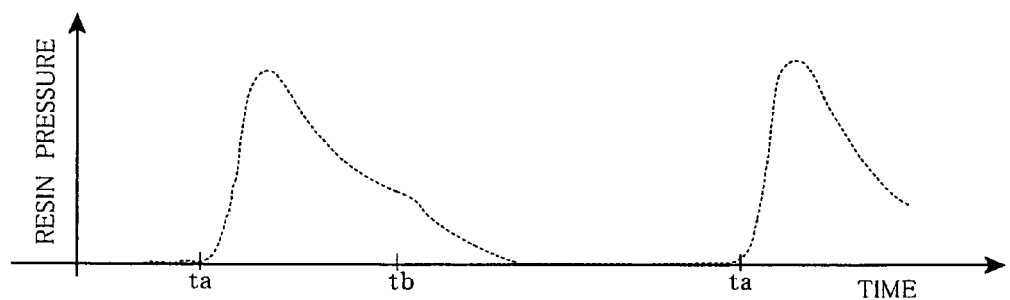
Figure 8C:
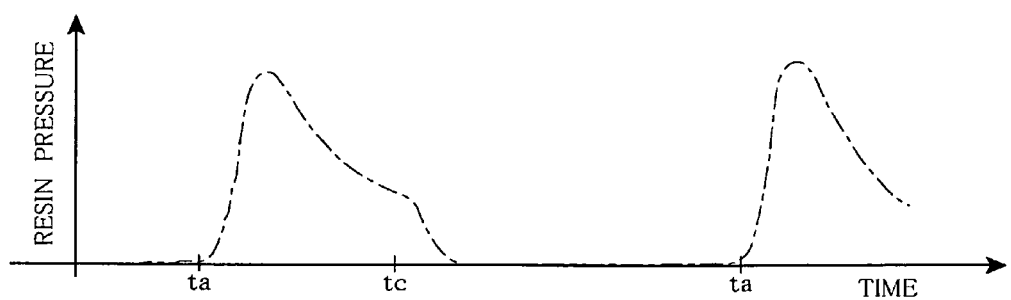

A graph of FIG. 8(b) shows an example when the suck-back control using the accumulators 42, 43 alone was performed, and a graph of FIG. 8(c) shows an example when the suck-back control using the second suck-back mechanism 60 alone was carried out. Moreover, a graph of FIG. 8(d) shows an example when both the suck-back control using the accumulators 42, 43 and the suck-back control using the second suck-back mechanism 60 were performed.

It is to be noted that, in each of the illustrated graphs, a vertical axis represents a resin pressure, a horizontal axis represents a time, ta denotes a supply start time of the sub-material by the accumulators 42, 43, tb denotes a suck-back control start time by the accumulators 42, 43, and tc denotes a suck-back control start time by the second suck-back mechanism 60. Additionally, FIG. 9 is a graph in which the graphs of FIGS. 8(a) to (d) are superimposed.

Figure 8D:
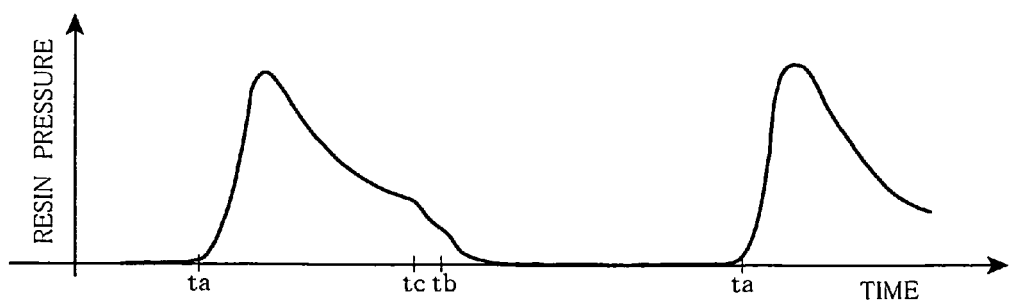
Figure 9:
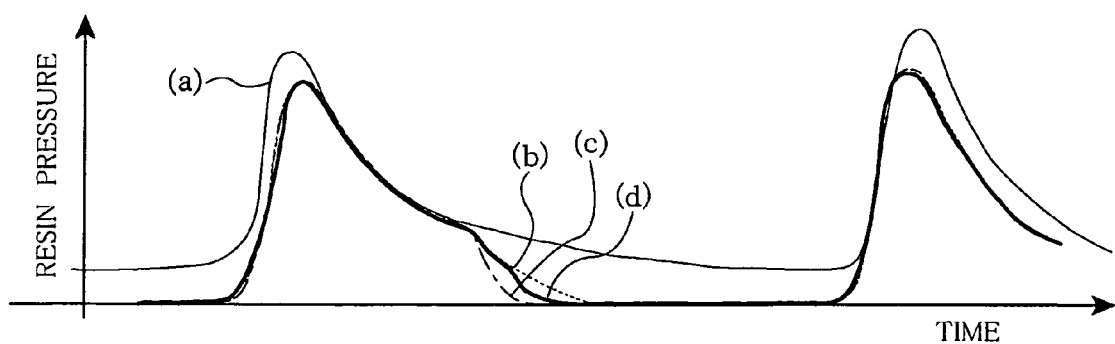
FIG. 9 is a graph in which the graphs depicted in FIGS. 8(a) to 8(d) are superimposed.

When the suck-back control is not effected, the inside of the communicating path 44 is always in a positive pressure state (see FIG. 8(a)), whereas the positive pressure state in the communicating state 44 is eliminated after completion of supply of the sub-material by performing the suck-back control (see FIGS. 8(b) to (d)).

Further, comparing the graph of FIG. 8(b) with the graph of FIG. 8(c), it can be understood that a reduction rate of the resin pressure after start of the suck-back control by the second suck-back mechanism 60 is larger than that when the suck-back control is performed by the accumulators 42, 43. On the other hand, in the graph of FIG. 8(d), a suck-back quantity by the second suck-back mechanism 60 is set smaller than a suck-back quantity when the suck-back control using the second suck-back mechanism 60 alone is performed, but the resin pressure in the communicating path 44 can be reduced without extremely increasing the reduction rate by effecting the suck-back control using the accumulators 42, 43 after the suck-back control utilizing the second suck-back mechanism 60.

In the manufacturing apparatus of a resin container according to this embodiment, as the sub-extruder 30, it is possible to use not only an extruder which extrudes a fixed quantity of a resin at a time in accordance with a predetermined operation but also an extruder including a reciprocating type screw which extrudes a fixed quantity of a resin at fixed intervals. In this case, a back-and-forth movement of the screw of the sub-extruder 30 is controlled in synchronization with an operation of the switching valve 45 and an operation of each of the accumulators 42, 43. Further, as the sub-extruder 30, an extruder which continuously extrudes a resin can be used.

Figure 14:
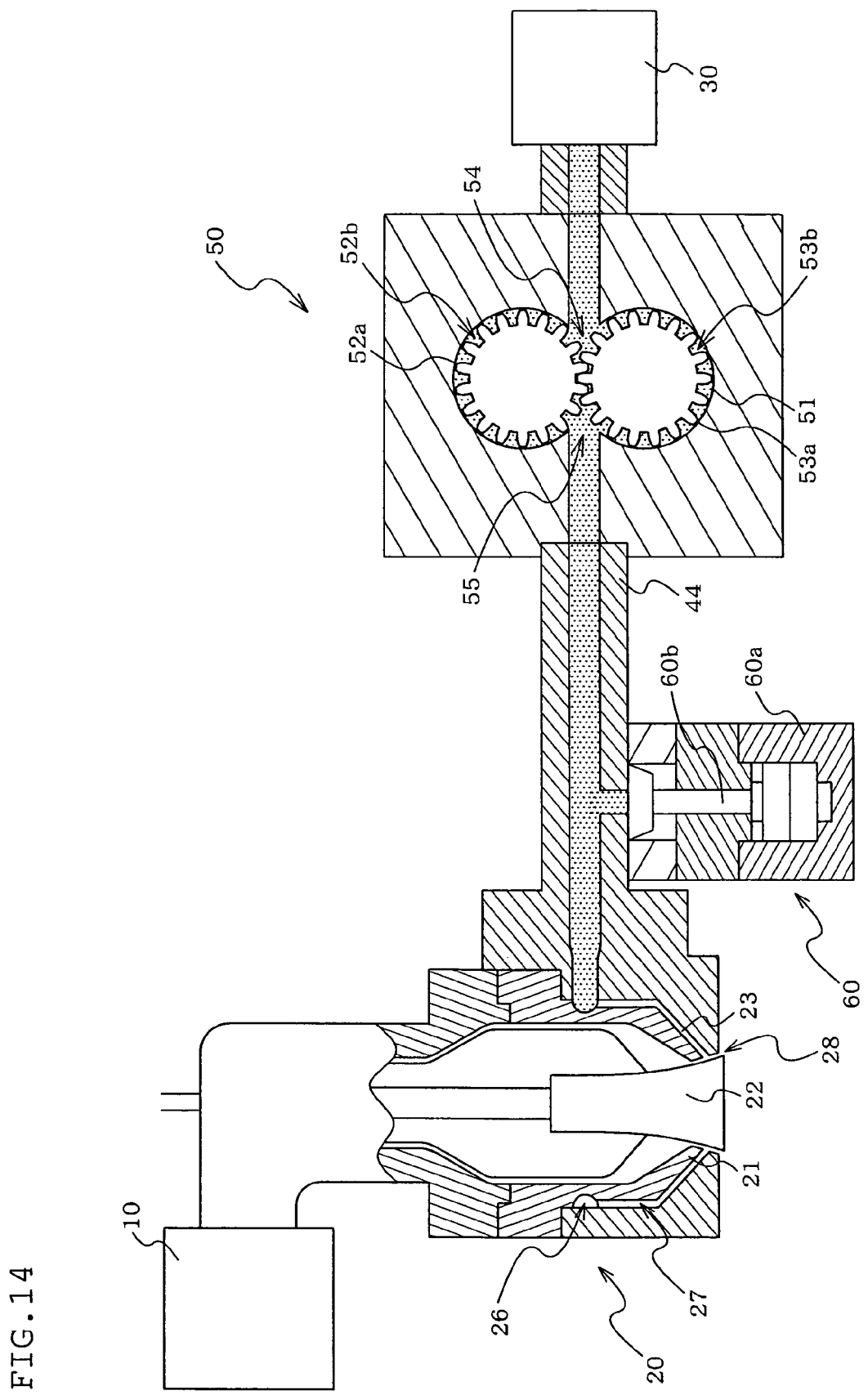
FIG. 14 is a schematic cross-sectional view showing another embodiment of the manufacturing apparatus of a resin container according to the present invention.

Although a fixed quantity of the sub-material is intermittently supplied to the die head 20 in the above-described example, the sub-material may be supplied continuously as long as supply of the sub-material is carried out in accordance with one molding cycle. For example, as shown in FIG. 14, a gear pump 50 can substitute for the storage portion 40 so that a flow rate of the sub-material extruded from the sub-extruder 30 is controlled to enable continuous supply.

The gear pump 50 is provided with a gear case 51 and two gears 52a and 53a. The gears 52a and 53a rotate in a direction indicated by an arrow in the drawing while meshing with each other. When the mesh of the two gears 52a and 53a is released at an inflow portion 54, the sub-material supplied from the sub-extruder 30 enters gear grooves 52b and 53b.

The sub-material which has entered the gear grooves 52b and 53b is held between the gear case 51 and the gear grooves 52b and 53b, and carried to an outflow portion 55 in a rotation direction of the gears 52a and 53a, i.e., a direction indicated by an arrow in the drawing by rotation of the gears 52a and 53a. When teeth of the gears 52a and 53a again mesh with each other at the outflow portion 55, the sub-material in the gear grooves 52b and 53b is pushed out and sequentially supplied to the outflow portion 55.

When such a gear pump 50 is used, the sub-material can be continuously supplied while controlling a flow rate of the sub-material fed to the die head 20 by appropriately adjusting a extrusion quantity of the sub-material from the sub-extruder 30 and a rotating speed of the gears 52a and 53a. Furthermore, rotating the gears 52a and 53a in a reverse direction can enable the suck-back control.

The configuration of this apparatus in the above manner enables the change in the thickness of the coating layer 3 with a higher degree of freedom. Furthermore, combining this apparatus with the above-described rotary die head 20 can provide a more complicated shape of the coating layer 3.

Second Embodiment

Figure 15:
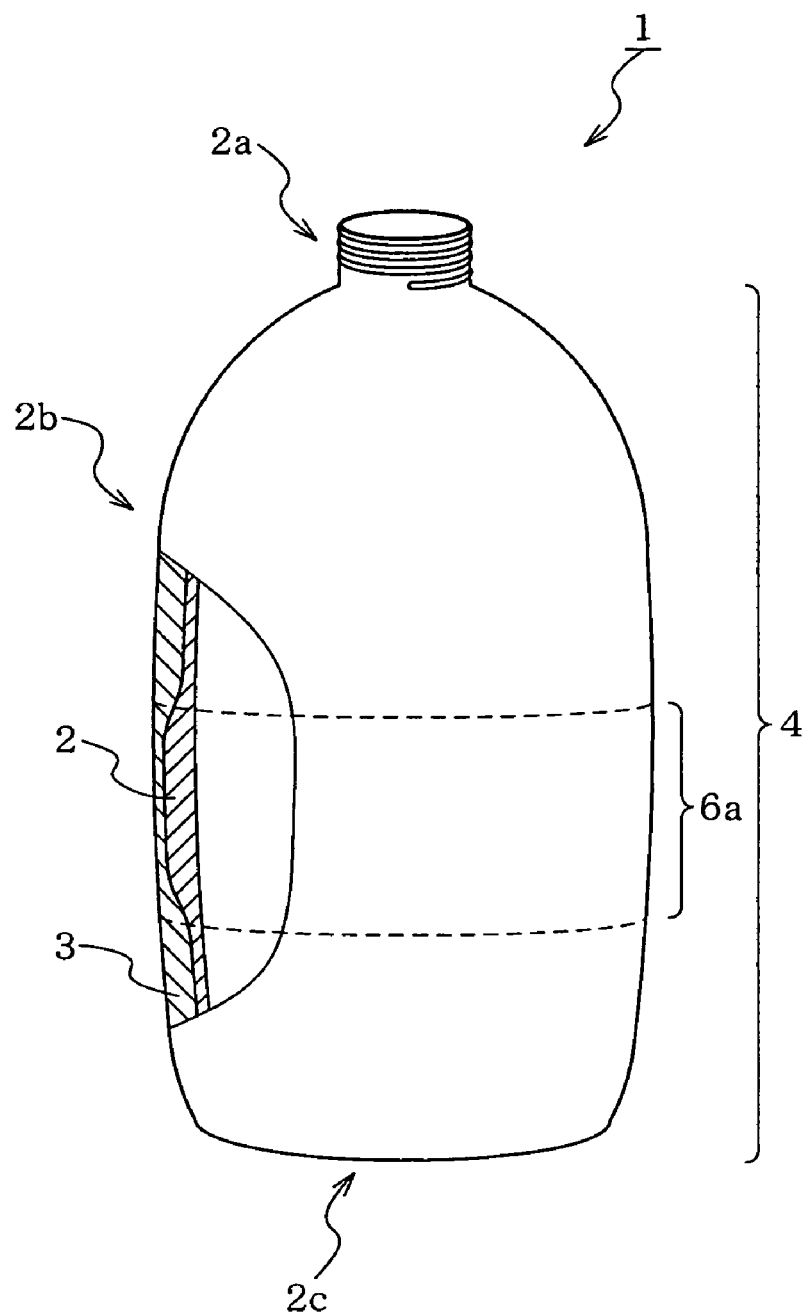
FIG. 15 is a partially cutaway cross-sectional view showing an outline of a resin container according to a second embodiment of the present invention.

A second embodiment according to the present invention will now be described. FIG. 15 shows an outline of a resin container according to a second embodiment of the present invention, and is a partially cutaway cross-sectional view in which a resin container 1 is partially cut away.

The illustrated resin container 1 is an example applied to a shampoo container like the first embodiment. Although a coating layer 3 which covers a container body 2 is formed in the resin container 1, a position at which the coating layer 3 is formed is an entire surface of the container as different from the first embodiment.

A thin-walled portion 6a in which a thickness is gradually reduced is provided to the coating layer 3. In the thin-walled portion 6a, a surface of the container body 2 can be seen through the coating layer 3 as the coating layer 3 gradually becomes thinner. As a result, a change in color appears like the thickness reducing portion 6 in the first embodiment. That is, the thin-walled portion 6a in this embodiment is a part which demonstrates the same function as that of the thickness reducing portion 6 in the first embodiment.

Here, the thin-walled portion 6a is a part where the above-described phenomenon is developed, and means a predetermined range in the coating layer 3 which is formed with a thin wall as compared with other parts of the coating layer 3. In the drawing, a chain line indicates a boundary between the thin-walled portion 6a and the other part of the coating layer 3.

This embodiment is different from the first embodiment in that the coating layer 3 does not disappear. In the thin-walled portion 6a, the coating layer 3 gradually becomes thin, and then a thickness thereof is maintained without change, or a thickness thereof is gradually increased. A change in thickness may be repeated in such a manner that the thickness is increased and then again reduced, for example. A configuration in which the coating layer 3 disappears while gradually reducing its thickness and the coating layer non-forming part 5 is formed falls within a scope of the first embodiment as described above even if the coating layer 3 covers the substantially entire surface of the container body 2.

A more specific description will now be given with reference to the example shown in FIG. 15. The coating layer 3 which covers the entire surface of the container body 1 is formed in the resin container 1. The strip-like thin-walled portion 6a is formed along a circumferential direction of the resin container 1. In the drawing, as shown in the cross-sectional view, when seeing the resin container 1 from a top side toward a bottom side in a height direction, the thickness of the coating layer 3 is gradually reduced, then a fixed thickness is maintained, and thereafter the thickness is gradually increased. This substantially corresponds to a configuration in which the positions of the container body 2 and the coating layer 3 are counterchanged in the third modification of the first embodiment. In this embodiment, therefore, a change in color which is the same as that of the third modification can be expressed in the thin-walled portion 6a.

Moreover, in the first embodiment, since a decorative design having a high sense of togetherness can be readily realized and the container shape itself is the same as that of a usually utilized type of container, it is preferable to maintain the thickness of the container itself substantially constant irrespective of the coating layer forming part 4 or the coating layer non-forming part 5. In this embodiment, likewise, it is preferable to maintain at least the thickness of the base portion 2b of the container body 2 substantially constant irrespective of the thin-walled portion 6a for the same reason.

This embodiment is largely different from the first embodiment in the above-described point but has substantially the same configuration at any other parts, and hence a detailed description of any other structure will be eliminated. Additionally, the resin container 1 according to this embodiment can be preferably manufactured by the above-described manufacturing apparatus like the first embodiment.

In this embodiment mentioned above, a change in color can be expressed on the surface of the resin container 1 by a change in thickness alone of the coating layer 3 which is formed integrally with the container body 2 like the first embodiment. As a result, a decorative design using a color or a colored pattern can be applied to the container itself with a high degree of freedom. In addition to this, since the obtained decorative design is realized by the coating layer 3 which is formed integrally with the container body 2, the decorative design having a higher sense of togetherness with the container can be provided. Consequently, a high value can be added to the container, and the resin container which appeals to consumers can be obtained.

Third Embodiment

The above-described first and second embodiments enhance the value of the resin container by demonstrating a design effect. The resin container according to the present invention can also enhance the value by demonstrating a functional effect. As a third embodiment of the resin container according to the present invention, an example of the latter case will now be described hereinafter.

Figure 16:
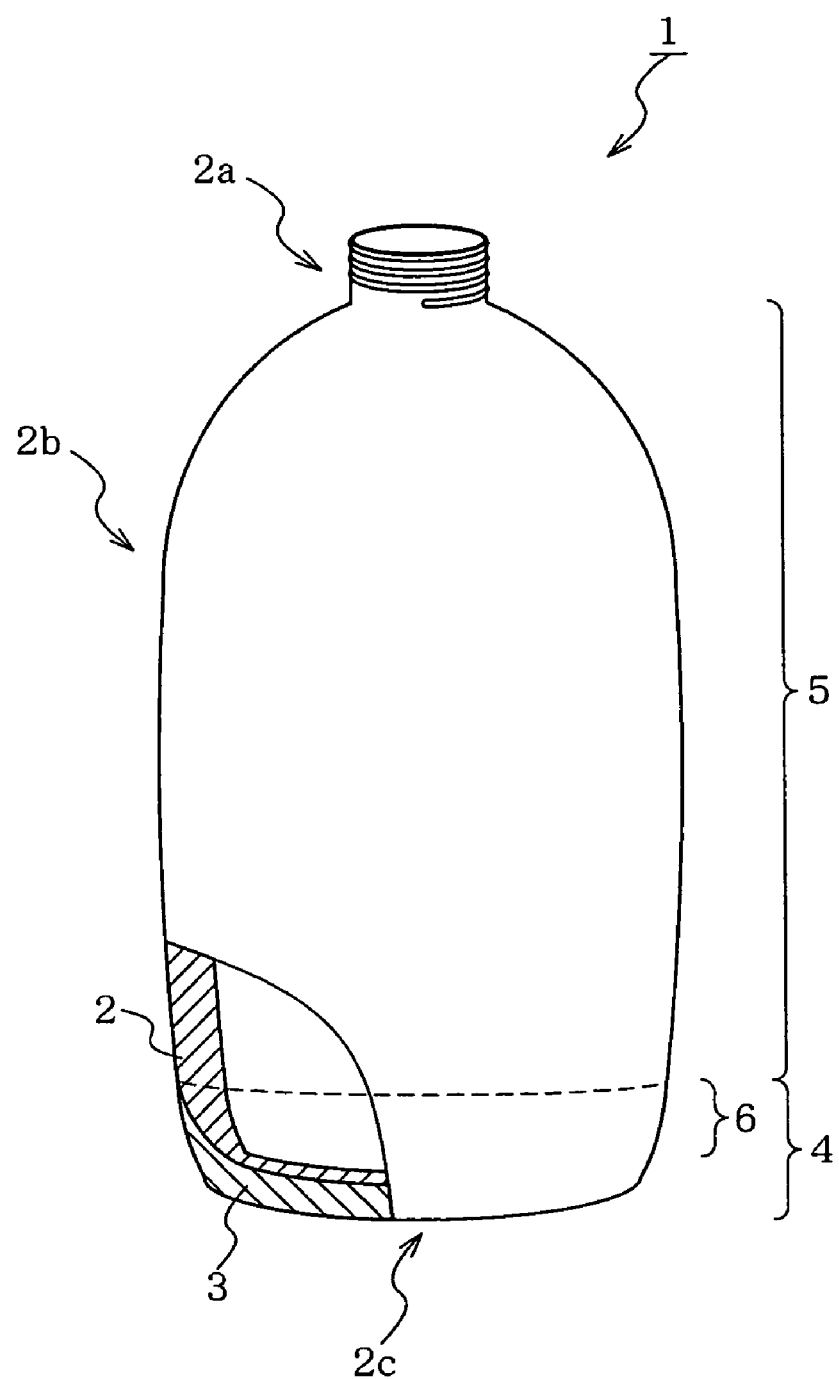
FIG. 16 is a partially cutaway cross-sectional view showing an outline of a resin container according to a third embodiment of the present invention.

FIG. 16 shows an outline of a resin container according to a third embodiment of the present invention, and is a partially cutaway cross-sectional view in which a resin container 1 is partially cut away. The illustrated resin container 1 is an example applied to a shampoo container like the first embodiment. Although a coating layer 3 which partially covers a container body 2 is formed in the resin container 1, as different from the first embodiment, a position at which the coating layer 3 is formed is a bottom portion 2c of the container and the vicinity thereof as shown in the drawing.

In this embodiment, a base material resin forming a container body 2 is not subjected to special processing. Usually, a resin utilized to manufacture this type of resin container is used as it is. On the other hand, a sub-material forming the coating layer 3 has properties different from those of the base material resin by adding an antibacterial agent to the same resin as the base material resin. This embodiment is largely different from the first embodiment in the above-described point but is provided with substantially the same configuration at any other parts, and hence a detailed description of any other structure will be eliminated. Furthermore, the resin container 1 according to this embodiment can be preferably manufactured by the above-described manufacturing apparatus like the first embodiment.

The shampoo container exemplified as this embodiment is used under a humid environment like a bathroom for a long period of time, and it is often the case that this container gets moldy. It is unsanitary to leave the moldy container as it is, and it is unpleasant to the eyes. In order to suppress such generation of the mold, adding an antibacterial agent to a resin forming the container can be considered. However, an antibacterial agent is expensive, and an increase in cost of the container is unavoidable. According to this embodiment, the coating layer 3 containing an antibacterial agent is partially formed at the bottom portion of the container or the vicinity thereof where the mold is apt to be generated. As a result, an increase in cost can be suppressed, and it is possible to provide the high value-added resin container 1 which demonstrates a further effective antibacterial effect or fungus proofing function with a small amount of the antibacterial agent.

Furthermore, the bottom portion of the container and the vicinity thereof are apt to get moldy, but it is not true that a side surface of the container does not get moldy at all. Even if the mold is generated on the side surface of the container, a part which gets moldy and a part where occurrence of the mold is suppressed by the mildew proofing function of the antibacterial agent are not clearly observed in the resin container 1 according to this embodiment. That is, since the thickness of the coating layer 3 to which the antibacterial agent is added is gradually reduced in the thickness reducing portion 6, the mildew proofing function is also weakened with this gradual reduction. If such a change in thickness of the coating layer 3 does not exist, a boundary between the part where the mildew proofing function is demonstrated and the part where the same is not demonstrated becomes clear, the clear boundary appears by presence or absence of the mold, and hence a very unpleasant inconvenience can be considered.

Such an inconvenience can be effectively avoided in this embodiment. Furthermore, the base material resin and the sub-material are different from each other in addition of the antibacterial agent alone in this embodiment. Therefore, the coating layer forming part 4 and the coating layer non-forming part 5 are not outwardly discriminated, and the container according to this embodiment is the same as a regular container. As a result, unpredictably quality can be given to consumers.

As described above, according to this embodiment, the above-mentioned functional effect can enhance the value of the container, and the resin container which greatly appeals to consumers can be obtained.

Although the above has described the present invention with reference to the preferred embodiments, it is needless to say that the present invention is not restricted to the foregoing embodiments and can be modified in many ways within the scope of the invention. For example, although the above has described the example of the shampoo container, the present invention can be applied to containers of food products such as food items or beverages, sanitary goods such as a body soap, cosmetics, or drugs. Moreover, the present invention is not restricted to the container which is relatively rigid, e.g., a shampoo container, and it can be applied to a container having flexibility.

As described above, the present invention enhances the value of the container by an excellent design effect or functional effect, and provides the manufacturing apparatus of the resin container.

While the invention has been explained with reference to the specific embodiments of the invention, the explanation is illustrative and the invention is limited only by the appended claims.

What is claimed is:

1. A manufacturing apparatus of a resin container, comprising:
    a die head having a slit portion on an end side and a discharge portion provided in a vicinity of the slit portion;
    a main extruder which supplies a base material resin to the die head to extrude a parison through the slit portion;
    a sub-extruder having a flow path connected to the discharge portion to supply a sub-material, the sub-material supplied from the sub-extruder being discharged from the discharge portion provided in the die head so that the sub-material joins the base material resin continuously supplied from the main extruder, the parison being subjected to blow molding, thereby forming a coating layer which covers a whole or part of a container body formed of the base material resin by using the sub-material; and
    a suck-back mechanism which pulls back the sub-material from the discharge portion and is provided between the sub-extruder and the die head, the suck-back mechanism comprising a first suck-back device connected to a rear portion of the flow path, and a second suck-back device connected to the flow path between the rear portion and the discharge portion and adjacent to the discharge portion.

2. The manufacturing apparatus of a resin container according to claim 1, wherein the flow path comprises an annular portion which is formed to relatively approximate the discharge portion as distanced from a side where the sub-material is supplied; and a cone-shaped portion which is continuous with the discharge portion from the annular portion.

3. The manufacturing apparatus of a resin container according to claim 1, wherein the first suck-back device is an accumulator with a piston for the sub-extruder to be operated to suck-back the sub-material.

4. The manufacturing apparatus of a resin container according to claim 1, further comprising first and second accumulators with pistons for storing the sub-material, and a switching portion for connecting the first and second accumulators to the flow path, one of the first and second accumulators with pistons operating as the first suck-back device.

5. The manufacturing apparatus of a resin container according to claim 1, wherein the second suck-back device comprises a cylinder and a piston situated in the cylinder.

* * * * *